(12) United States Patent
Patidar et al.

(10) Patent No.: US 12,399,211 B2
(45) Date of Patent: *Aug. 26, 2025

(54) METHOD OF TESTING AN INTEGRATED CIRCUIT AND TESTING SYSTEM

(71) Applicants: TAIWAN SEMICONDUCTOR MANUFACTURING COMPANY, LTD., Hsinchu (TW); TSMC NANJING COMPANY, LIMITED, Jiangsu (CN)

(72) Inventors: Ankita Patidar, Hsinchu (TW); Sandeep Kumar Goel, Hsinchu (TW); Yun-Han Lee, Hsinchu (TW)

(73) Assignees: TAIWAN SEMICONDUCTOR MANUFACTURING COMPANY, LTD., Hsinchu (TW); TSMC NANJING COMPANY, LIMITED, Nanjing (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/521,432

(22) Filed: Nov. 28, 2023

(65) Prior Publication Data

US 2024/0094281 A1    Mar. 21, 2024

Related U.S. Application Data

(63) Continuation of application No. 17/393,232, filed on Aug. 3, 2021, now Pat. No. 11,879,933.

(30) Foreign Application Priority Data

Jul. 2, 2021    (CN) .......................... 202110752449.3

(51) Int. Cl.
*G01R 31/28* (2006.01)
*G01R 31/317* (2006.01)
(Continued)

(52) U.S. Cl.
CPC .................... *G01R 31/2855* (2013.01); *G01R 31/31721* (2013.01); *G06F 30/398* (2020.01); *G06F 2119/08* (2020.01)

(58) Field of Classification Search
CPC .......... G01R 31/2855; G01R 31/31721; G01R 31/287; G01R 31/31707; G01R 31/2874;
(Continued)

(56) References Cited

U.S. PATENT DOCUMENTS 7,260,442 B2    8/2007   Hwang et al.
7,449,904 B2 *  11/2008  Pullen .................. G01R 31/287
                                             324/750.06
(Continued)

FOREIGN PATENT DOCUMENTS

CN    1926439    3/2007
CN    102169516  8/2011
(Continued)

OTHER PUBLICATIONS

B. Yueh et al., "Design, Characterization, and Application of a Field-Programmable Thermal Emulation Platform", IEEE Transactions on Components, Packaging and Manufacturing Technology, vol. 6, No. 9, Sep. 2016 (Year: 2016).*

*Primary Examiner* — Eman A Alkafawi
*Assistant Examiner* — Dilara Sultana
(74) *Attorney, Agent, or Firm* — Hauptman Ham, LLP

(57) ABSTRACT

A method of testing an integrated circuit on a test circuit board includes performing, by a processor, a simulation of a first heat distribution throughout an integrated circuit design, and simultaneously performing a burn-in test of the integrated circuit and an automated test of the integrated circuit. The burn-in test has a minimum burn-in temperature of the integrated circuit or a burn-in heat distribution across the integrated circuit that includes a set of circuit blocks or
(Continued)

a first set of heaters. The integrated circuit design corresponding to the integrated circuit. The performing the simulation includes determining a heat signature of the integrated circuit design from configured power information or location information for each circuit block of the set of circuit blocks or each heater of the set of heaters included in the integrated circuit design. The heat signature includes heat values distributed throughout the integrated circuit design.

20 Claims, 18 Drawing Sheets

(51) Int. Cl.
*G06F 30/398* (2020.01)
*G06F 119/08* (2020.01)

(58) Field of Classification Search
CPC .... G01R 31/003; G01R 31/01; G01R 31/317; G06F 30/398; G06F 2119/08; G06F 2119/06; G06F 30/39
See application file for complete search history.

(56) References Cited

U.S. PATENT DOCUMENTS

| | | |
|---|---|---|
| 8,212,576 B1 * | 7/2012 | Cho .................. G01R 31/2856 324/750.01 |
| 9,255,964 B2 | 2/2016 | Kinsley |
| 9,256,709 B2 | 2/2016 | Yu et al. |
| 10,289,777 B2 | 5/2019 | Liu et al. |
| 2002/0000824 A1 | 1/2002 | Chetlur et al. |
| 2002/0171449 A1 | 11/2002 | Shimizu et al. |
| 2004/0012404 A1 | 1/2004 | Feder et al. |
| 2004/0175850 A1 | 9/2004 | Shimizu et al. |
| 2008/0100327 A1 | 5/2008 | Lee et al. |
| 2008/0231306 A1 | 9/2008 | Maggi et al. |
| 2009/0024347 A1 | 1/2009 | Chandra et al. |
| 2009/0187368 A1 | 7/2009 | Jain |
| 2009/0316750 A1 * | 12/2009 | Sheng ...................... G01K 7/42 374/152 |
| 2014/0040838 A1 | 2/2014 | Liu et al. |
| 2014/0062515 A1 | 3/2014 | Vassighi et al. |
| 2015/0278429 A1 | 10/2015 | Chang |
| 2015/0370937 A1 | 12/2015 | Liu et al. |
| 2020/0004911 A1 | 1/2020 | Kim |
| 2020/0379033 A1 | 12/2020 | Chang |
| 2021/0132140 A1 | 5/2021 | Tsai et al. |
| 2021/0173007 A1 | 6/2021 | Landman et al. |

FOREIGN PATENT DOCUMENTS

| | | |
|---|---|---|
| CN | 102999656 | 3/2013 |
| CN | 103268369 | 8/2013 |
| CN | 104515952 | 4/2015 |
| CN | 108027403 | 5/2018 |
| JP | 2007201471 | 8/2007 |
| JP | 2010-257004 | 11/2010 |
| KR | 10-2008-0034879 | 4/2008 |

* cited by examiner

| | Column 1 | Column 2 | Column 3 |
|---|---|---|---|
| | IC Design Elements | Max Power | Configurable Power |
| 602a | CPU | 10W | 6W, 4W, 2.5W |
| 602b | GPU | 8W | 6W, 4W, 2W |
| 602c | Heater_1 | 2W | 1W, 0.5W |
| 602d | Heater_2 | 5W | 2.5W, 1.25W |
| 602e | PLL | 0.5W | 0.25W |

FIG. 6

METHOD OF TESTING AN INTEGRATED CIRCUIT AND TESTING SYSTEM

PRIORITY CLAIM AND CROSS-REFERENCE

The present application is a continuation of U.S. application Ser. No. 17/393,232, filed Aug. 3, 2021, now U.S. Pat. No. 11,879,933, issued Jan. 23, 2024, which claims the priority of China Application No. 202110752449.3, filed Jul. 2, 2021, which are herein incorporated by reference in their entireties.

BACKGROUND

The recent trend in miniaturizing integrated circuits (ICs) has resulted in smaller devices which consume less power, yet provide functionality at higher speeds. The miniaturization process has also resulted in stricter design and manufacturing specifications. Various electronic design automation (EDA) tools generate, optimize and verify designs for semiconductor devices while ensuring that the design and manufacturing specifications are met. However, testing of semiconductor devices is a time consuming process.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 6 is a table, in accordance with some embodiments.

DETAILED DESCRIPTION

Figure 1:
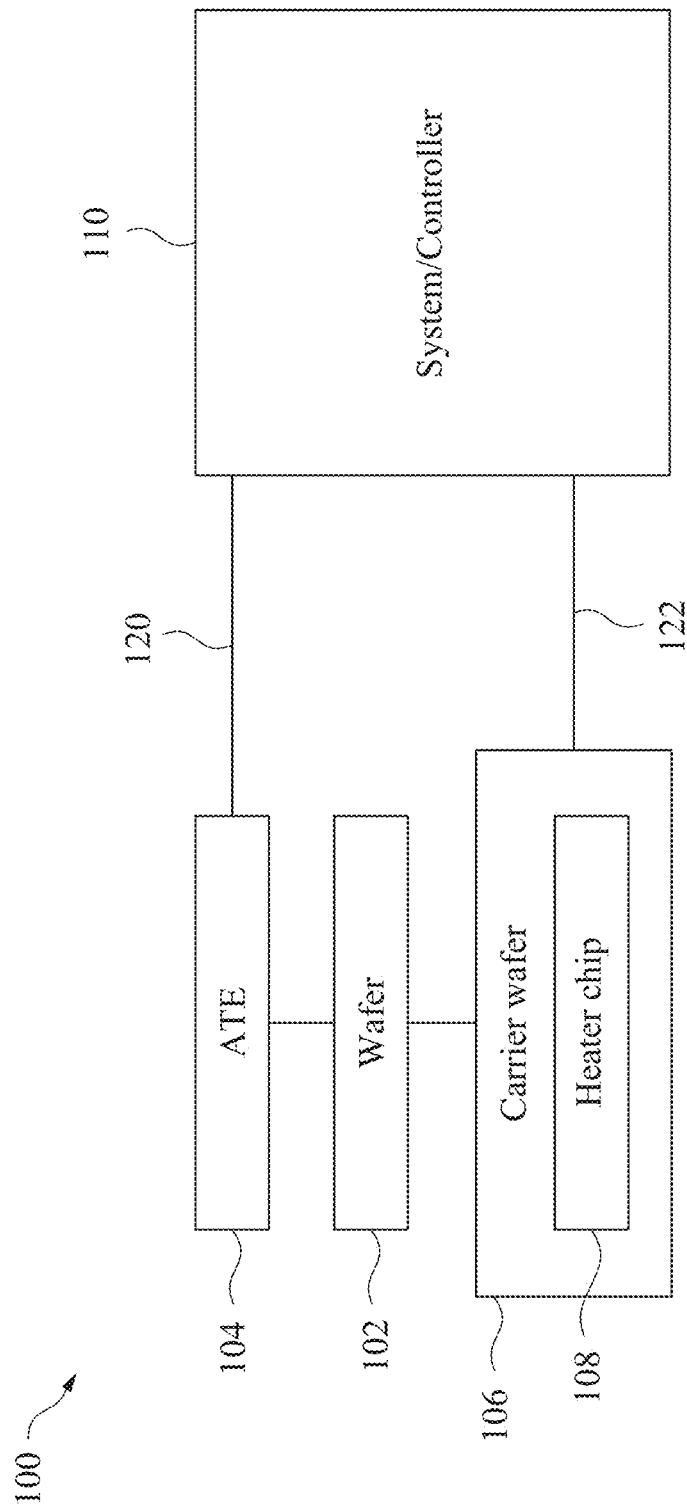
FIG. 1 is a block diagram of a system, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for case of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, a method of testing an integrated circuit includes performing a simulation of a first heat distribution throughout an integrated circuit design, manufacturing the integrated circuit according to the integrated circuit design, and simultaneously performing a burn-in test of the integrated circuit and an automated test of the integrated circuit.

In some embodiments, by simultaneously performing a burn-in test of the integrated circuit and the automated test of the integrated circuit, the method of testing the integrated circuit has a shorter testing time than other approaches where burn-in testing is performed after the automated test. In some embodiments, after failure of the integrated circuit is detected, burn-in testing is stopped, thereby decreasing the burn-in testing time.

FIG. 1 is a block diagram of a system 100, in accordance with some embodiments.

In some embodiments, system 100 is a testing system configured to test a wafer 102. In some embodiments, system 100 is configured to test an integrated circuit 201 (shown in FIG. 2).

System 100 includes a wafer 102 coupled to each of test circuit board 104 and a carrier wafer 106. Wafer 102 includes a plurality of integrated circuits 201 (shown in FIG. 2).

Test circuit board 104 is configured to perform one or more tests of wafer 102. Test circuit board 104 is electrically coupled to wafer 102. In some embodiments, the test circuit board 104 is an automatic test equipment (ATE) board, and is configured to perform one or more automated tests of wafer 102. Test circuit board 104 is electrically coupled between wafer 102 and a system 110. Test circuit board 104 is electrically coupled to system 110 by a link 120. In some embodiments, wafer 102 is electrically coupled to system 110 by test circuit board 104. Other configurations of wafer 102 or test circuit board 104 are within the scope of the present disclosure.

Carrier wafer 106 is configured to carry the wafer 102. Carrier wafer 106 includes one or more heater chips 108. Carrier wafer 106 and heater chip 108 are electrically coupled to system 110 by a link 122. In some embodiments, at least link 120 or 122 is a conductive wire. In some embodiments, at least link 120 or 122 is a data link configured to exchange data. In some embodiments, heater chip 108 includes one or more dies electrically coupled to system 110 by link 122, and are configured to generate heat during a burn-in test of wafer 102. Other configurations of carrier wafer 106 or heater chip 108 are within the scope of the present disclosure.

System 110 is electrically coupled to the integrated circuit within wafer 102 by test circuit board 104. System 110 is electrically coupled to the one or more heater chips 108 of carrier wafer 106 by link 122.

System 110 is configured to simultaneously perform a burn-in test of one or more integrated circuits in wafer 102 and one or more automated tests of one or more integrated circuits in wafer 102. In some embodiments, the one or more automated tests of the one or more integrated circuits in wafer 102 are performed by test circuit board 104 and system 110.

In some embodiments, a burn-in test includes testing wafer 102 for early failures of integrated circuits within wafer 102. In some embodiments, the burn-in test is configured to apply thermal stress and environmental stress to the integrated circuits within wafer 102, thus causing detectable failures in the integrated circuits within wafer 102. In some embodiments, the failures are caused by faults in the manufacturing processes of wafer 102. In some embodiments, the burn-in test is configured to apply a minimum burn-in temperature TBI over a duration of time. In some embodiments, the burn-in test is used to generate a burn-in heat distribution across the integrated circuits within wafer 102. In some embodiments, the minimum burn-in temperature TBI ranges from about 120° Celsius (C) to about 160° C. In some embodiments, the duration of time of the burn-in test ranges from about 12 hours to about 72 hours.

In some embodiments, the one or more automated tests performed by test circuit board 104 and system 110 include voltage measurements, current measurements, timing measurements, reliability tests, or the like. In some embodiments, the one or more automated tests include operational tests of the one or more integrated circuits in wafer 102.

Figure 2:
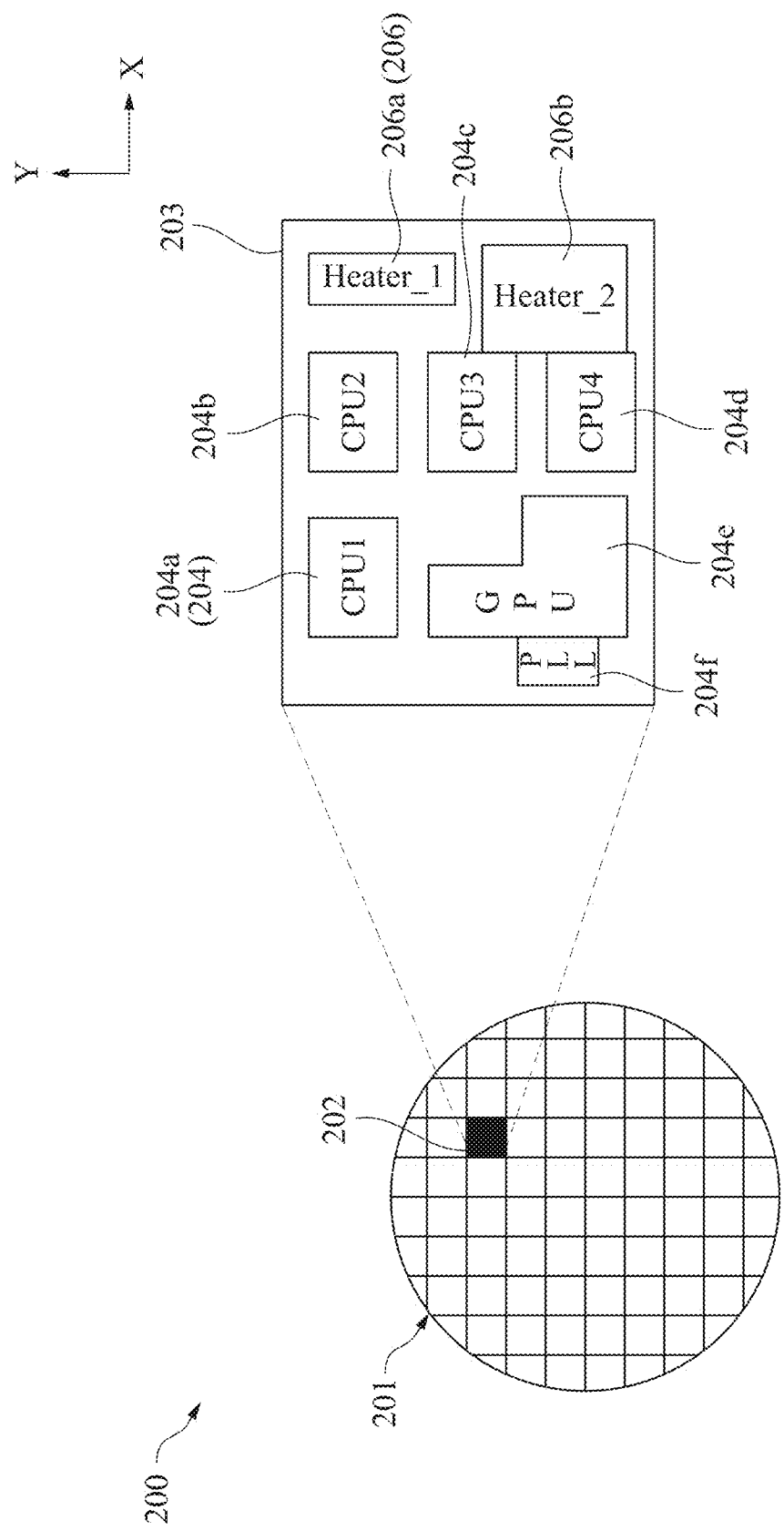
FIG. 2 is a diagram of a wafer, in accordance with some embodiments.

In some embodiments, system 110 is an electronic design automation (EDA) tool configured to design and simulate performance of an integrated circuit design 700 (shown in FIG. 7) usable to manufacture integrated circuit 201 (FIG. 2).

Other configurations of system 110 are within the scope of the present disclosure.

In some embodiments, by simultaneously performing a burn-in test of one or more integrated circuits in wafer 102 and one or more automated tests (e.g., ATE) of one or more integrated circuits in wafer 102, system 100 has a shorter testing time than other approaches where burn-in testing is performed after ATE testing. For example, in some embodiments, after failure of integrated circuits in wafer 102 are detected, burn-in testing can be stopped, thereby decreasing the burn-in testing time.

In some embodiments, by configuring carrier wafer 106 with one or more heater chips 108, heater chips 108 are configured as a heat source for burn-in testing of wafer 102, and thus provides a uniform baking solution such that system 100 is capable of performing burn-in testing without a burn-in board or an oven thereby lowering cost compared to other approaches that use a burn-in board or an oven.

Other configurations of system 100 are within the scope of the present disclosure.

FIG. 2 is a diagram of a wafer 200, in accordance with some embodiments.

Wafer 200 is an embodiment of wafer 102 of FIG. 1, and similar detailed description is therefore omitted. Components that are the same or similar to those in one or more of FIGS. 1-15 are given the same reference numbers, and detailed description thereof is thus omitted.

Wafer 200 includes a plurality of integrated circuits 201 arranged in an array.

A region 202 of wafer 200 corresponds to an integrated circuit 203 of the plurality of integrated circuits 201. Integrated circuit 203 corresponds to a single integrated circuit of the plurality of integrated circuits 201. In some embodiments, each integrated circuit of the plurality of integrated circuits 201 is the same. In some embodiments, at least one integrated circuit of the plurality of integrated circuits 201 is different from another integrated circuit of the plurality of integrated circuits 201.

In some embodiments, the details of integrated circuit 203 are applicable to one or more of the plurality of integrated circuits 201, and similar detailed description is omitted for brevity.

Other configurations of plurality of integrated circuits 201 are within the scope of the present disclosure.

Integrated circuit 203 includes a set of circuit blocks 204 and a set of heaters 206.

Set of circuit blocks 204 includes at least a central processing unit (CPU) $204a$, a CPU $240b$, a CPU $204c$, a CPU $204d$, a graphics processing unit (GPU) $204e$ or a phase locked loop (PLL) $204f$. Other numbers of circuits in set of circuit blocks 204 are within the scope of the present disclosure.

CPUs, GPU and PLL are used for illustration, and other types of circuits in set of circuit blocks 204 are within the scope of various embodiments. For example, in some embodiments, set of circuit blocks 204 includes embedded processors including processor cores, digital signal processing (DSP) cores, embedded GPUs, interfaces such as universal serial bus (USB) controllers, ETHERNET, PCI-E, WIFI, WIMAX, or BLUETOOTH, peripherals such as universal asynchronous receiver transmitter (UART) or power management blocks, or memory modules and/or controllers.

At least CPU $204a$, CPU $204b$, CPU $204c$, CPU $204d$, GPU $204e$ or PLL $204f$ of the set of circuit blocks 204 is configured to generate heat by being operated. In some embodiments, at least CPU $204a$, CPU $204b$, CPU $204c$, CPU $204d$, GPU $204e$ or PLL $204f$ of the set of circuit blocks 204 is configured to generate heat by being operated during burn-in testing and ATE testing of integrated circuit 203.

Set of heaters 206 includes at least a heater 206a or a heater 206b. At least heater 206a or 206b of the set of heaters 206 is configured to generate heat. In some embodiments, at least heater 206a or 206b of the set of heaters 206 is configured to generate heat during burn-in testing and ATE testing of integrated circuit 203. In some embodiments, when the set of heaters 206 is not being used for testing, at least heater 206a or 206b of the set of heaters 206 is not configured to be operational, and thus does not generate heat.

Figure 13:
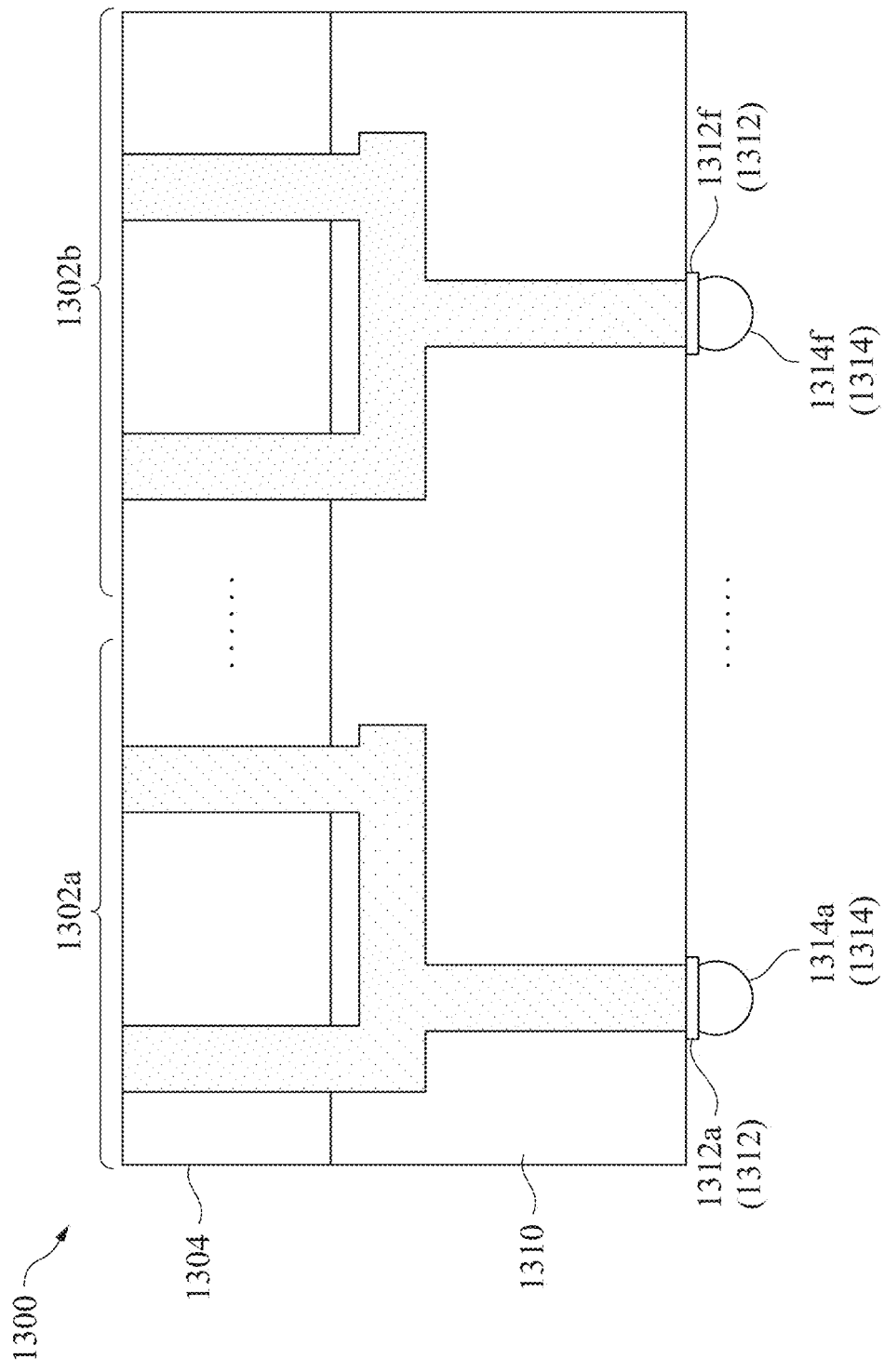
FIG. 13 is a cross-sectional view of a heater, in accordance with some embodiments.

In some embodiments, at least heater 206a or 206b of the set of heaters 206 includes one or more interconnects 1302a and 1302b (shown in FIG. 13). In some embodiments, at least heater 206a or 206b of the set of heaters 206 includes one or more circuit components configured to generate heat by being operated.

In some embodiments, the set of circuit blocks 204 and the set of heaters 206 are configured as a set of heat sources for at least the burn-in test or ATE tests performed by system 100, and thereby generate a heat signature of integrated circuit 203. In some embodiments, a heat signature corresponds to a map of a heat distribution throughout the integrated circuit. In some embodiments, an example of a heat distribution map 900C is shown in FIG. 9C.

In some embodiments, the set of circuit blocks 204 and the set of heaters 206 are configured to generate a uniform heat distribution throughout integrated circuit 203. In some embodiments, a uniform heat distribution corresponds to the heat distribution throughout the integrated circuit (e.g., integrated circuit 203) that is within a heat range HR (shown in FIG. 5). In some embodiments, the heat range is defined or specified by a user of system 100 or method 500 (shown in FIG. 5). In some embodiments, the heat range is between a minimum heat value and a maximum heat value.

In some embodiments, the heat distribution throughout integrated circuit 203 or the set of integrated circuits 201 is modified by changing at least positions, number of circuit elements, a size or configured powers of the set of circuit blocks 204 and the set of heaters 206. In some embodiments, at least the positions, number of circuit elements, size or configured powers of the set of circuit blocks 204 and the set of heaters 206 can be adjusted to generate a uniform heat distribution throughout integrated circuit 203. In some embodiments, if integrated circuit 203 or the set of integrated circuits 201 have a uniform heat distribution, then system 100 is configured to perform burn-in testing while reducing a number of active elements in heater chip 108 of FIG. 1.

In some embodiments, the set of circuit blocks 204 and the set of heaters 206 are modified to generate a uniform heat distribution throughout integrated circuit 203 by operating at configured power levels that correspond to simulated design power levels (e.g., table 600 in FIG. 6). In some embodiments, in response to integrated circuit 203 or the set of integrated circuits 201 having a uniform heat distribution, system 100 is configured to perform burn-in testing without using active elements in heater chip 108 of FIG. 1

Other configurations of the set of circuit blocks 204 and the set of heaters 206 are within the scope of the present disclosure.

Other configurations of wafer 200 are within the scope of the present disclosure.

Figure 3:
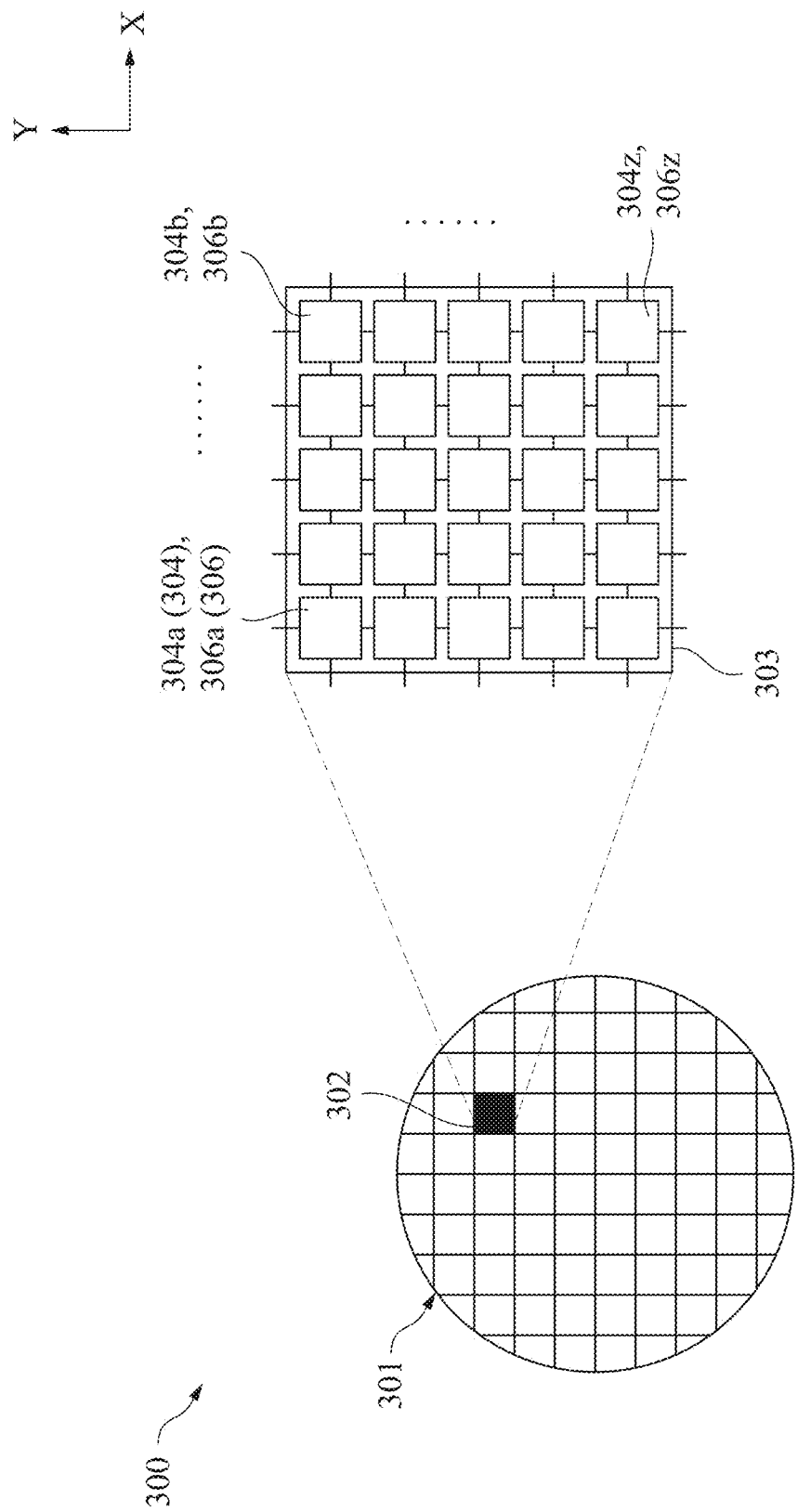
FIG. 3 is a diagram of a carrier wafer, in accordance with some embodiments.

FIG. 3 is a diagram of a carrier wafer 300, in accordance with some embodiments.

Carrier wafer 300 is an embodiment of carrier wafer 106 of FIG. 1, and similar detailed description is therefore omitted.

Carrier wafer 300 includes a plurality of integrated circuit dies 301 arranged in an array.

A region 302 of carrier wafer 300 corresponds to an integrated circuit die 303 of the plurality of integrated circuit dies 301. Integrated circuit die 303 corresponds to a single integrated circuit die of the plurality of integrated circuit dies 301. In some embodiments, each integrated circuit die of the plurality of integrated circuit dies 301 is the same as another integrated circuit die of the plurality of integrated circuit dies. In some embodiments, at least one integrated circuit die of the plurality of integrated circuit dies 301 is different from another integrated circuit die of the plurality of integrated circuit dies 301.

Region 302 has a same area as region 202 of wafer 200. In some embodiments, region 302 has a different area as region 202 of wafer 200.

Each integrated circuit die of the plurality of integrated circuit dies 301 is associated with each corresponding integrated circuit of the plurality of integrated circuits 201 of wafer 200. In some embodiments, a position of each corresponding integrated circuit die of the plurality of integrated circuit dies 301 is in a same corresponding position as each corresponding integrated circuit of the plurality of integrated circuits 201 of wafer 200.

Each integrated circuit die of the plurality of integrated circuit dies 301 has a same area as each integrated circuit of the plurality of integrated circuits 201 of wafer 200. In some embodiments, at least one integrated circuit die of the plurality of integrated circuit dies 301 has a different area as at least one integrated circuit of the plurality of integrated circuits 201 of wafer 200.

In some embodiments, the details of integrated circuit die 303 are applicable to one or more of the plurality of integrated circuit dies 301, and similar detailed description is omitted for brevity.

Other configurations of the plurality of integrated circuit dies 301 are within the scope of the present disclosure.

Integrated circuit die 303 includes a set of circuit dies 304. Set of circuit dies 304 is an array of dies that includes at least die 304a, 304b, . . . , 304y or 304z, where z is a positive integer corresponding to the number of dies in the set of circuit dies 304.

Each die of the set of circuit dies 304 is the same as each other die of the set of circuit dies. In some embodiments, at least one die of the set of circuit dies 304 is different from at least another die of the set of circuit dies 304.

Each die of the set of circuit dies 304 has a same area as each other die of the set of circuit dies. In some embodiments, at least one die of the set of circuit dies 304 has a different area as at least another die of the set of circuit dies 304.

Each die of the set of circuit dies 304 is configured to operate as a corresponding heater of a set of heaters 306.

Set of heaters 306 includes at least heater 306a, 306b, . . . , 306y or 306z. Each heater of the set of heaters 306 is configured to generate heat. In some embodiments, at least one or more heaters of the set of heaters 306 is configured to generate heat during burn-in testing and ATE testing of integrated circuit 203.

In some embodiments, heat distribution throughout integrated circuit die 303 or the set of integrated circuit dies 301 is modified by adjusting configured powers or turning on or off the corresponding dies in the set of circuit dies 304. In some embodiments, a sub-set of heaters in the set of heaters 306 is turned off by turning off a corresponding sub-set of dies of the set of dies 304, and thus do not generate heat. In some embodiments, a sub-set of heaters in the set of heaters 306 is turned on by turning on a corresponding sub-set of dies of the set of dies 304, and thus generate heat.

In some embodiments, the set of circuit dies 304 and the set of heaters 306 are configured as another set of heat sources for at least the burn-in test or ATE tests performed by system 100, and thereby generate another heat signature of integrated circuit die 203.

In some embodiments, the heat signature generated by integrated circuit 203 is combined with another heat signature of integrated circuit die 303, to thereby generate a uniform heat distribution throughout integrated circuit 203. In some embodiments, by generating a uniform heat distribution throughout integrated circuit 203, burn-in testing performed on integrated circuit 203 and integrated circuit die 303 achieves one or more of the benefits discussed above in FIG. 1.

In some embodiments, integrated circuit die 303 or the set of integrated circuit dies 301 is configured as a supplemental heat source that when combined with the heat source of integrated circuit 203 or the set of integrated circuits 301 thereby generate a uniform heat distribution throughout integrated circuit 203.

In some embodiments, by adjusting the number of operational or turned-on dies in the set of dies 304 adjusts the number of heaters in the set of heaters 306 thereby adjusting the amount of heat generated by integrated circuit die 303, and thus integrated circuit die 303 functions as a supplemental heat source to the heat source of integrated circuit 203.

Other configurations of the set of circuit dies 304 and the set of heaters 306 are within the scope of the present disclosure.

Other configurations of carrier wafer 300 are within the scope of the present disclosure.

Figure 4:
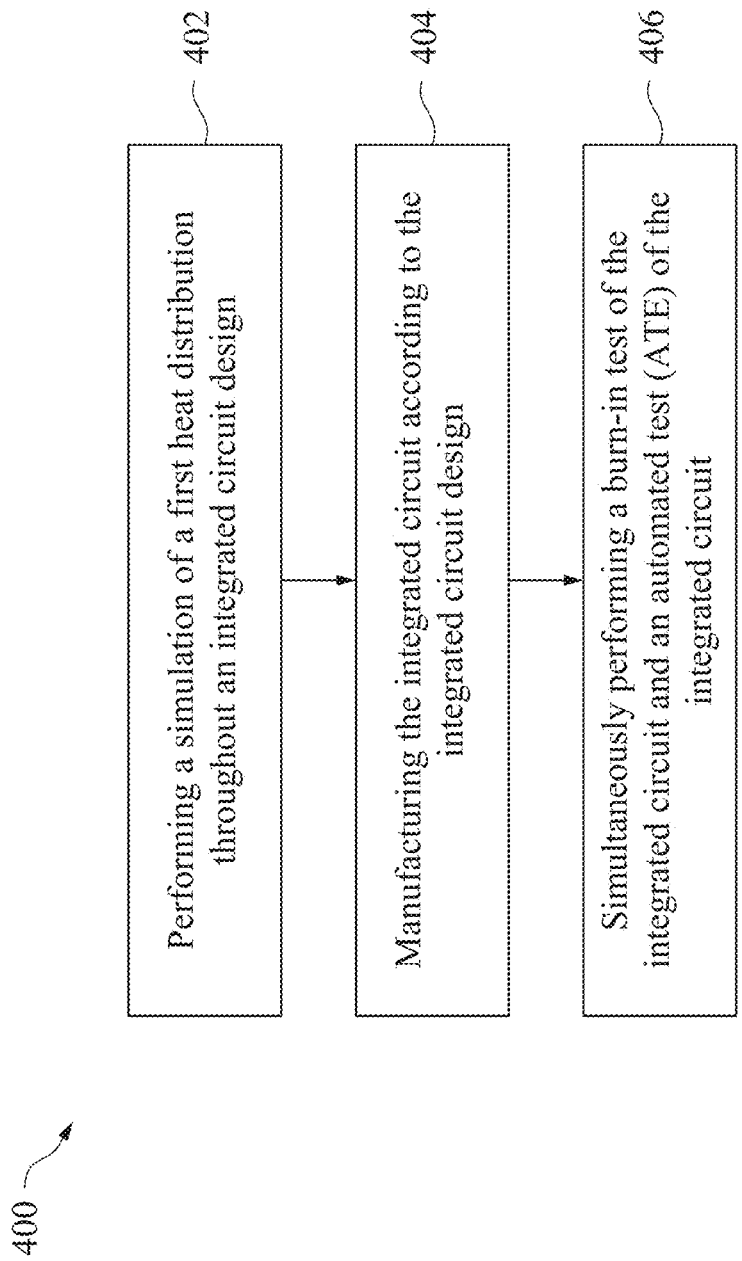
FIG. 4 is a flowchart of a method of testing an integrated circuit, in accordance with some embodiments.

FIG. 4 is a flowchart of a method 400 of testing an integrated circuit, in accordance with some embodiments.

Figure 14:
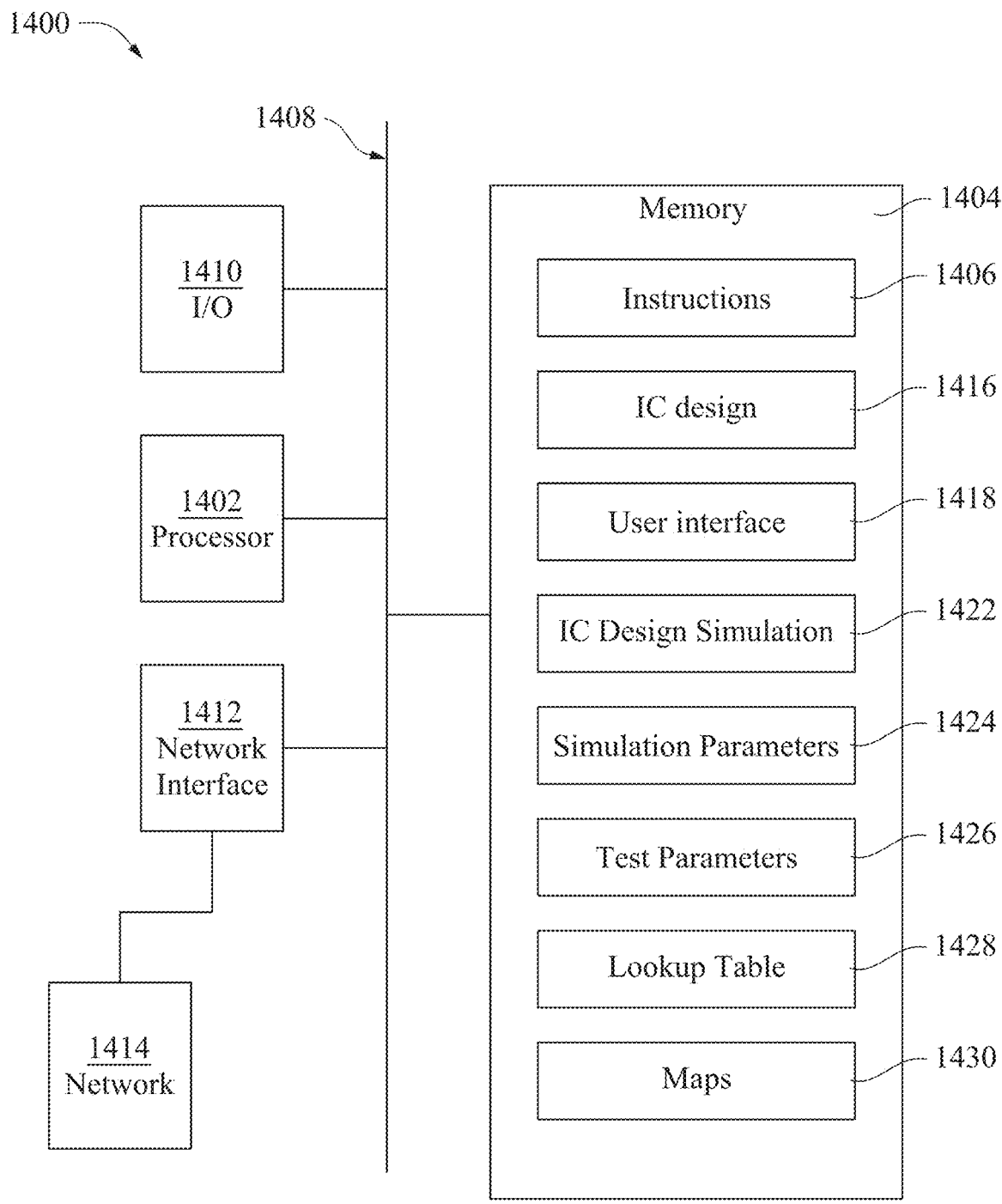
FIG. 14 is a schematic view of a system for designing an IC layout design, simulating an IC design, and manufacturing an IC circuit in accordance with some embodiments.

In some embodiments, FIG. 4 is a flowchart of a method of operating system 100 of FIG. 1, system 1400 of FIG. 14 or IC manufacturing system 1500.

Figure 5:
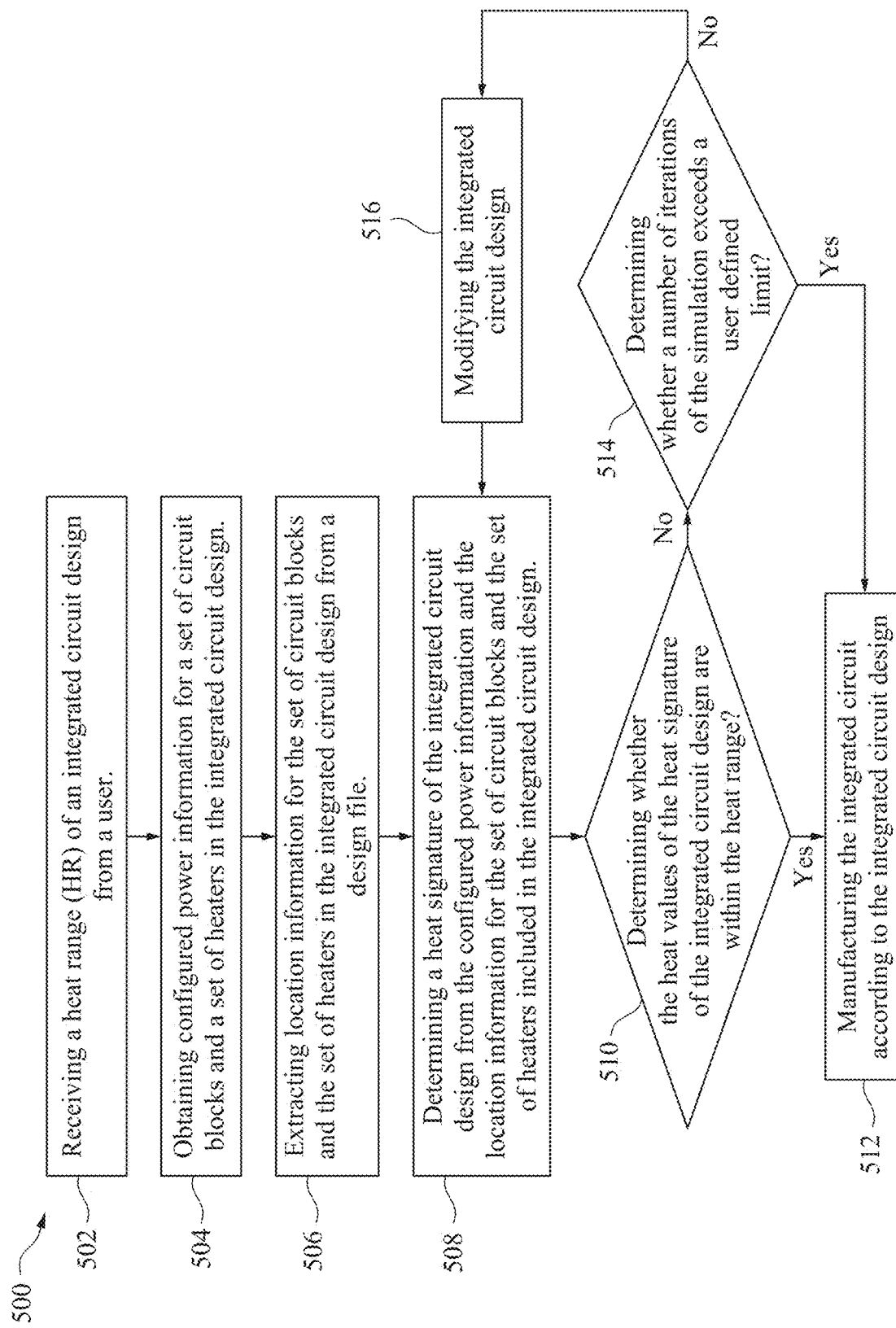
FIG. 5 is a flowchart of a method, in accordance with some embodiments.
Figure 8:
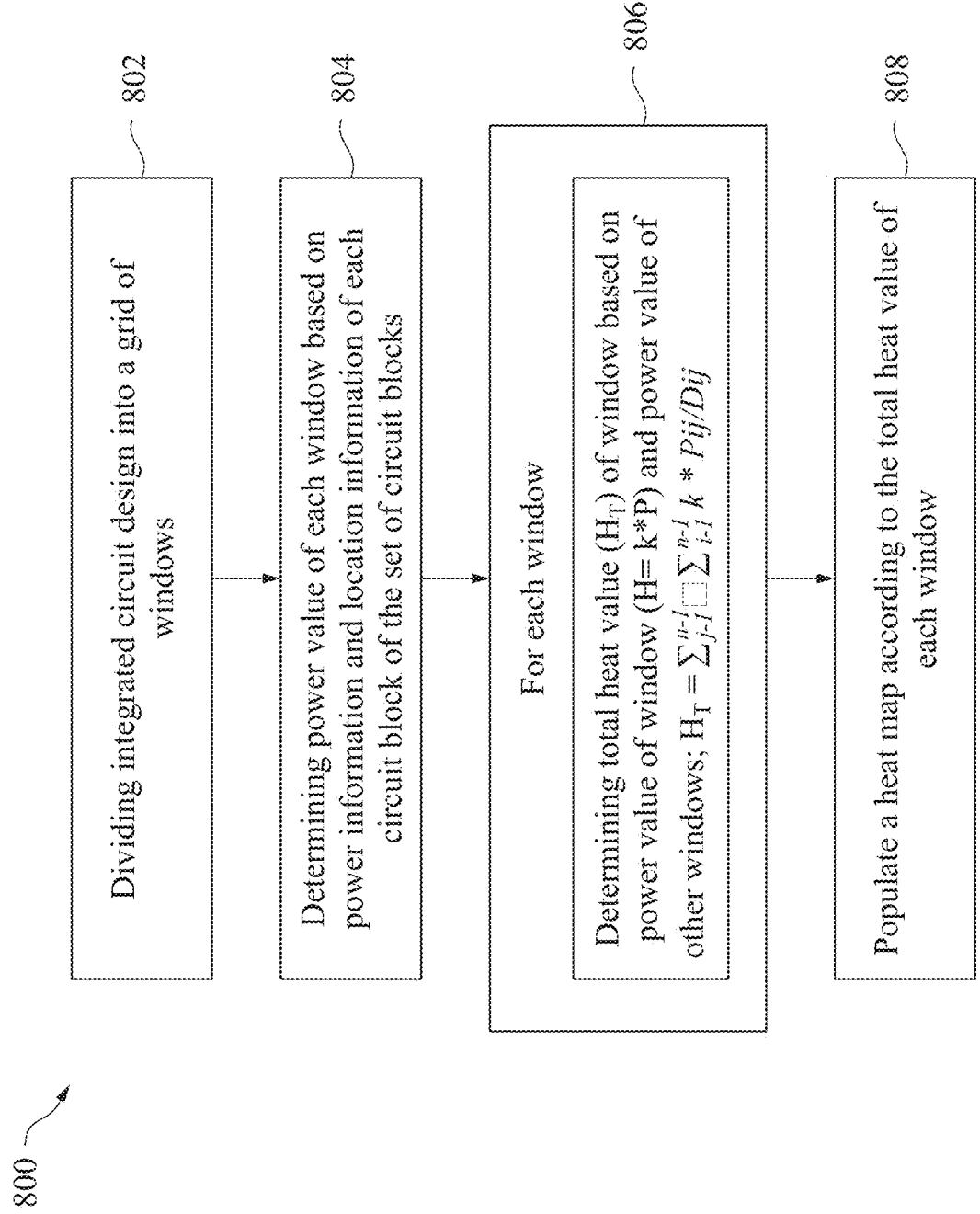
FIG. 8 is a flowchart of a method of determining a heat signature of an integrated circuit design, in accordance with some embodiments.
Figure 10:
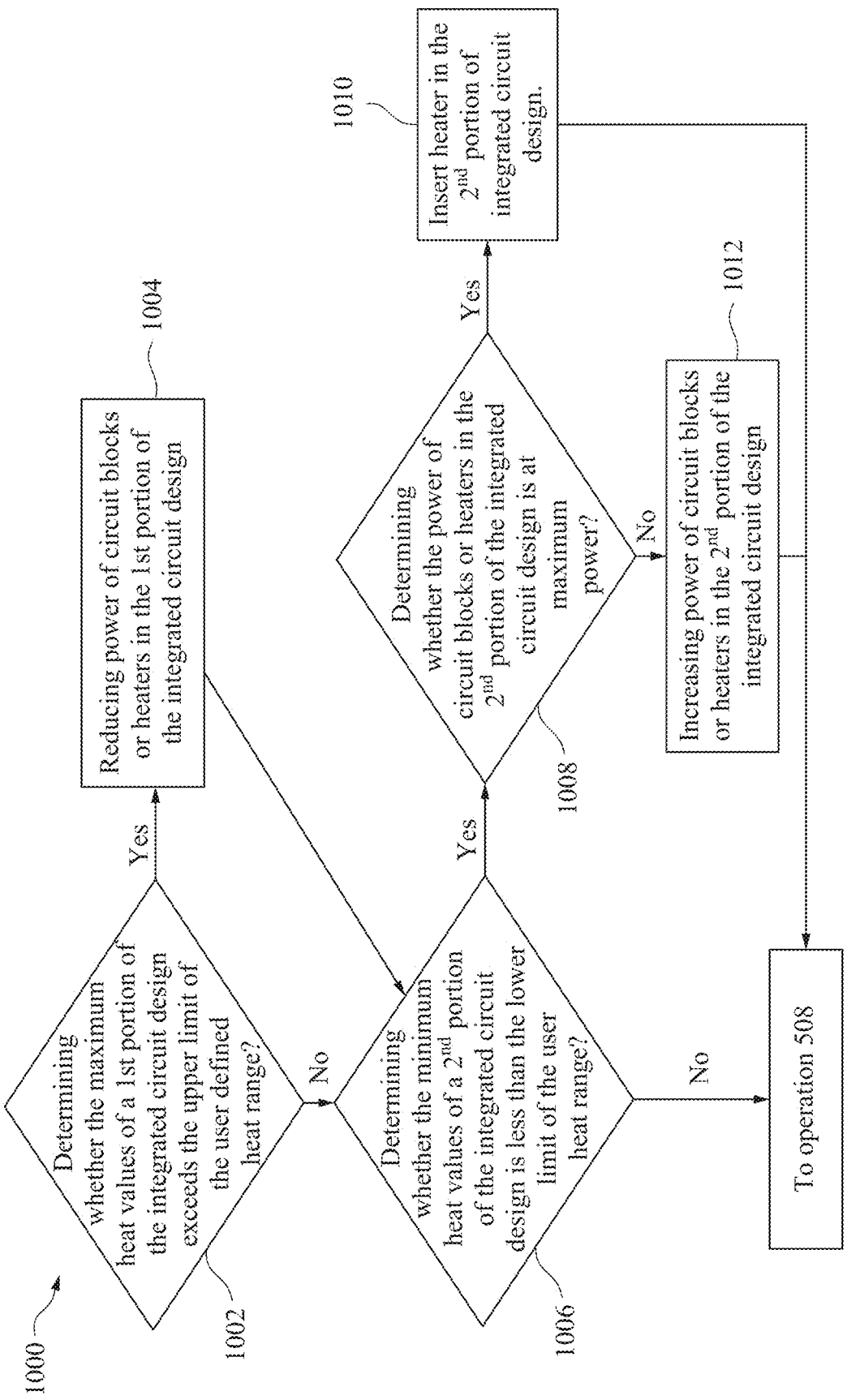
FIG. 10 is a flowchart of a method of modifying an integrated circuit design, in accordance with some embodiments.
Figure 12:
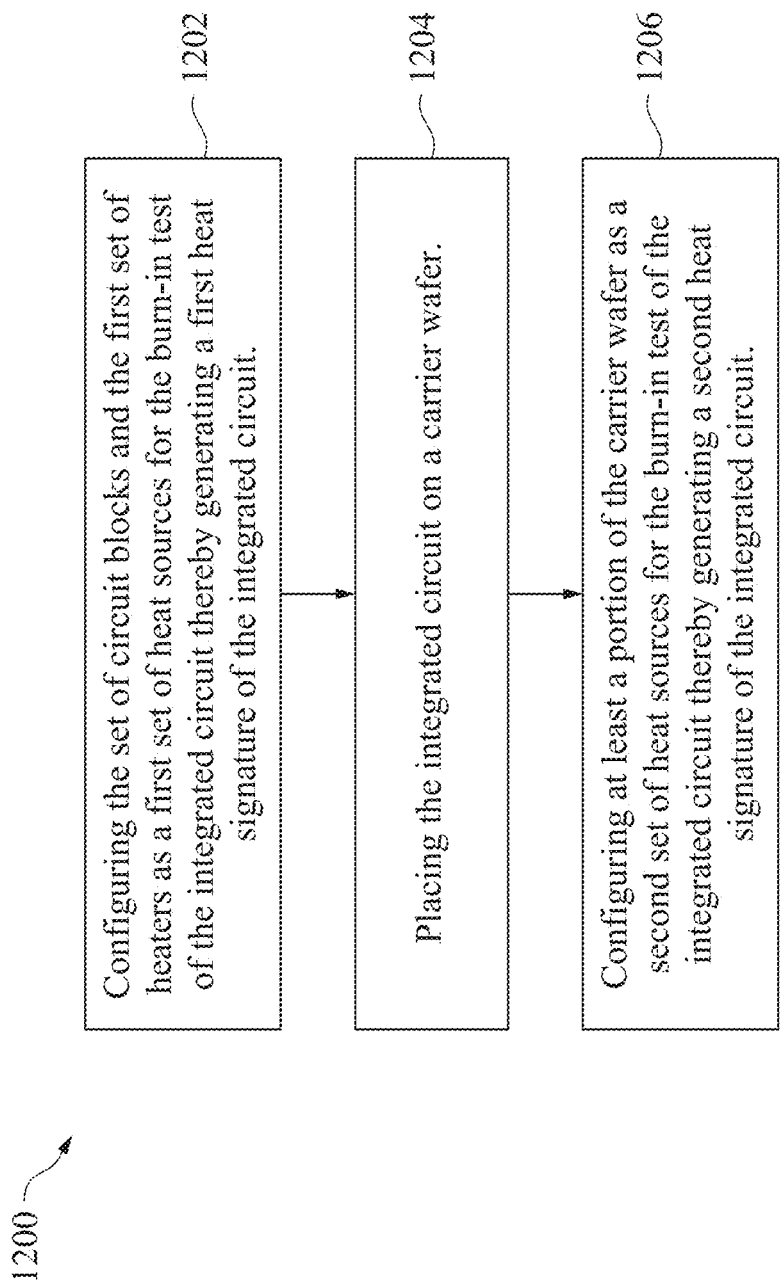
FIG. 12 is a flowchart of a method of simultaneously performing a burn-in test of the integrated circuit and an automated test of the integrated circuit, in accordance with some embodiments.

It is understood that additional operations may be performed before, during, and/or after at least the method 400 depicted in FIG. 4, method 500 depicted in FIG. 5, method 800 depicted in FIG. 8, method 1000 depicted in FIG. 10, or method 1200 depicted in FIG. 12, and that some other operations may only be briefly described herein. In some embodiments, other order of operations of at least method 400, method 500, method 800, method 1000, or method 1200 is within the scope of the present disclosure. In some embodiments, one or more operations of at least method 400, method 500, method 800, method 1000, or method 1200 are not performed.

At least method 400, method 500, method 800, method 1000, or method 1200 includes exemplary operations, but the operations of at least method 400, method 500, method 800, method 1000, or method 1200 are not necessarily performed in the order shown. Operations of at least method 400, method 500, method 800, method 1000, or method 1200 may be added, replaced, changed order, and/or eliminated as appropriate, in accordance with the spirit and scope of disclosed embodiments. It is understood that at least method 400, method 500, method 800, method 1000, or method 1200 utilizes features of one or more of system 100, wafer 200, carrier wafer 300, system 1400 or IC manufacturing system 1500.

In operation 402 of method 400, a simulation of a heat distribution throughout an integrated circuit design is performed by a processor. In some embodiments, the simulation of operation 402 is a computer simulation performed by system 1400 of FIG. 14. In some embodiments, the processor of method 400 includes processor 1402 of FIG. 14.

Figure 7:
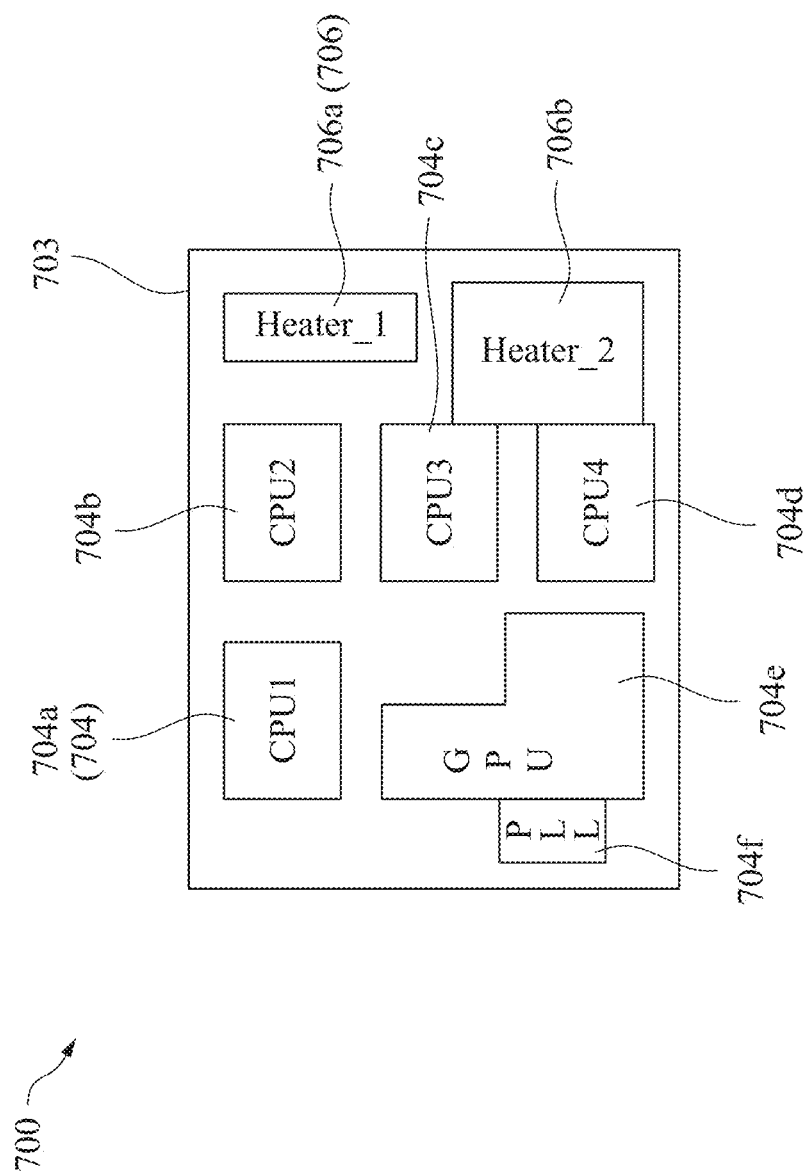
FIG. 7 is a block diagram of an integrated circuit design, in accordance with some embodiments.
Figure 9A:
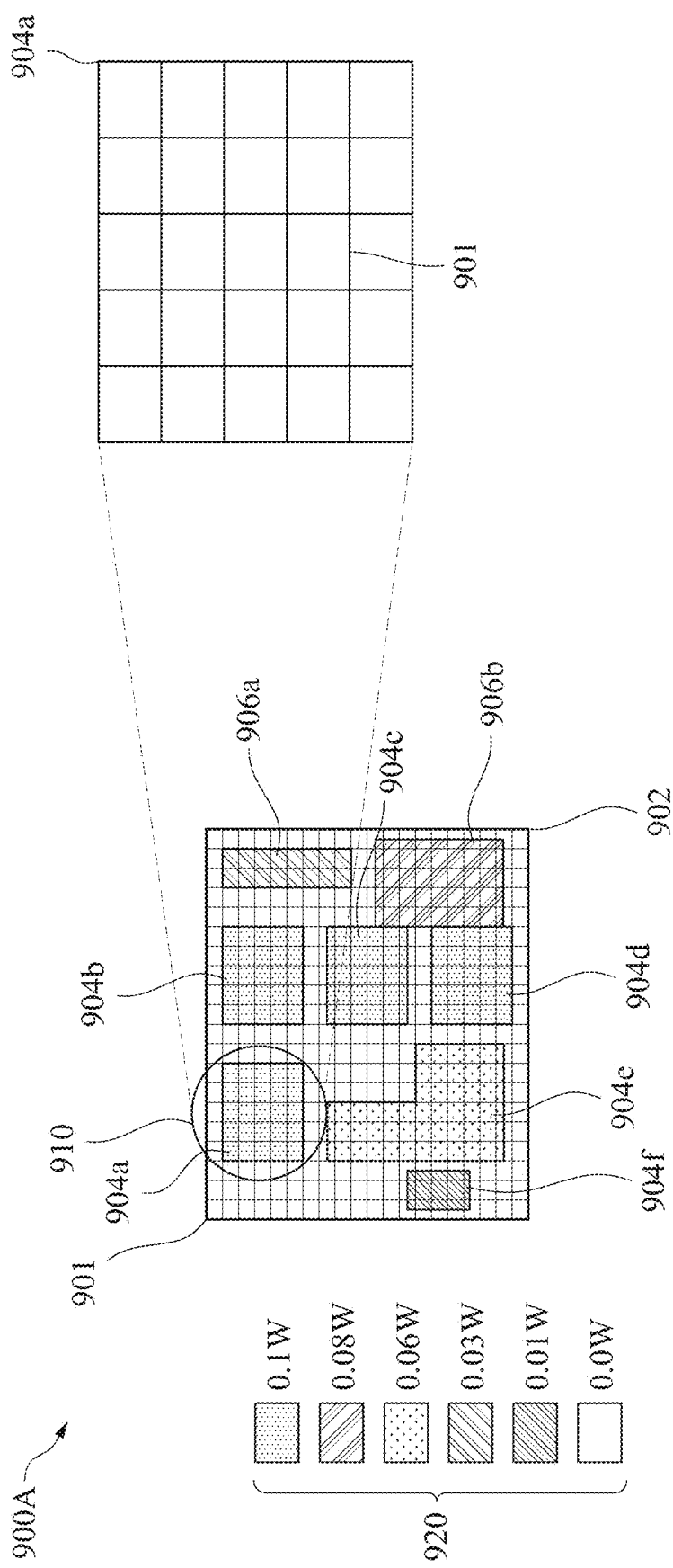
FIG. 9A is a diagram of a power map, in accordance with some embodiments.
Figures 9B, 9C:
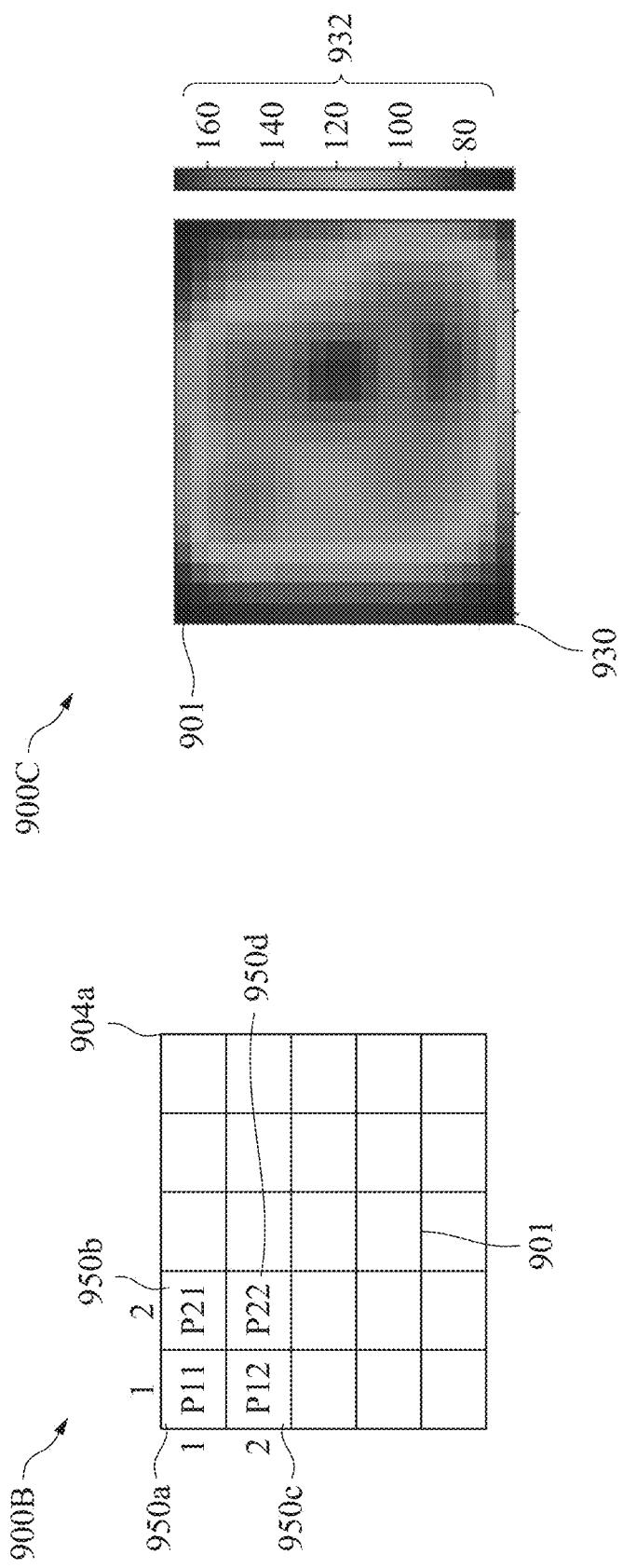
FIG. 9B is a block diagram of an integrated circuit design, in accordance with some embodiments.
FIG. 9C is a diagram of a heat map, in accordance with some embodiments.
Figure 11A:
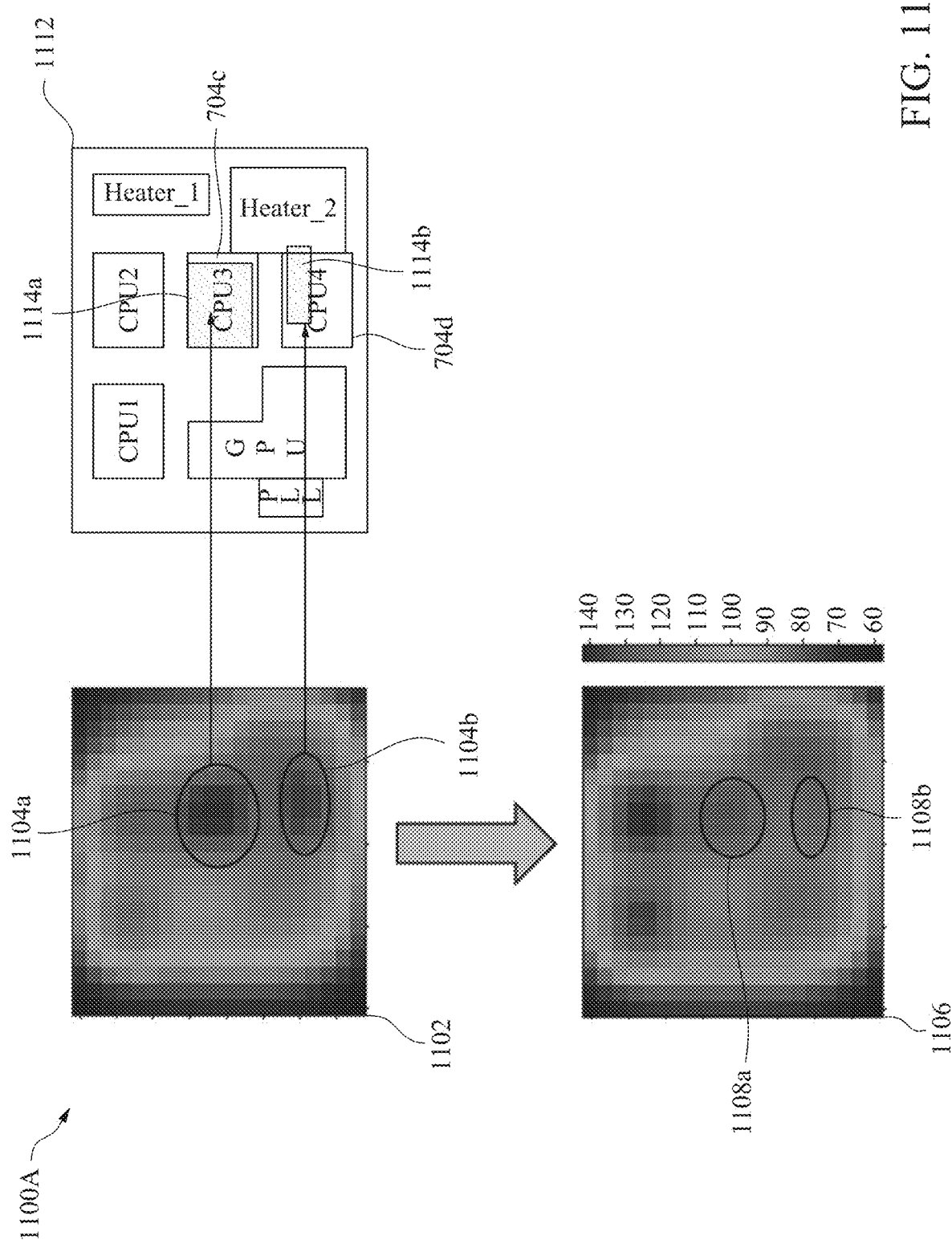
FIG. 11A is a diagram of power maps and an integrated circuit design, in accordance with some embodiments.
Figure 11B:
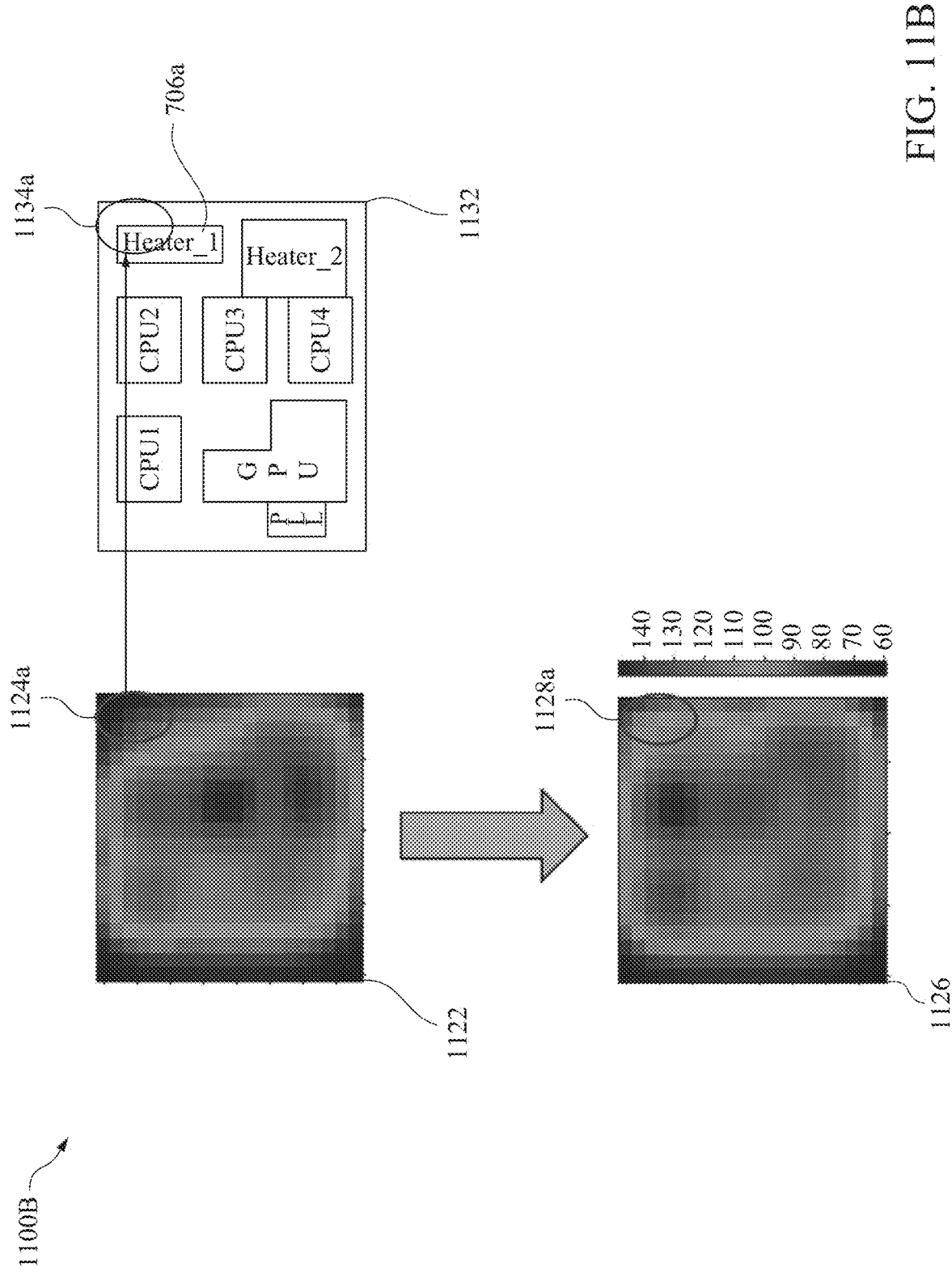
FIG. 11B is a diagram of power maps and an integrated circuit design, in accordance with some embodiments.
Figure 11C:
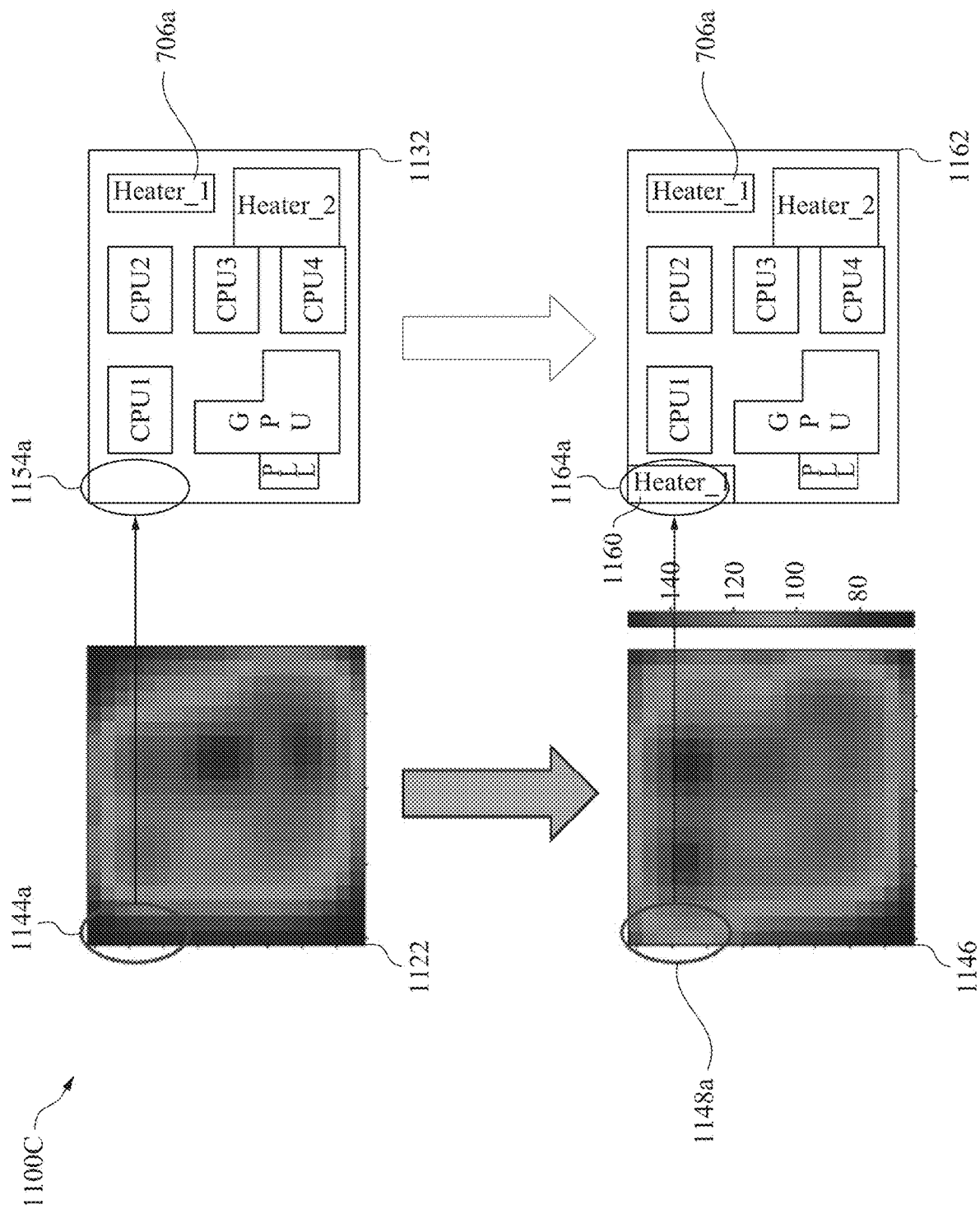
FIG. 11C is a diagram of power maps and an integrated circuit design, in accordance with some embodiments.

In some embodiments, the integrated circuit design of method 400 includes at least integrated circuit design 700 of FIG. 7, integrated circuit design 900A of FIG. 9A, integrated circuit design 1112 of FIG. 11A, integrated circuit design 1132 of FIGS. 11B-11C, or integrated circuit design 1162 of FIG. 11C. In some embodiments, the integrated circuit design of method 400 is a design of an integrated circuit.

In some embodiments, the heat distribution of method 400 includes at least the heat distribution shown by heat signature 930 of FIG. 9C, the heat distribution shown by heat signature 1102 of FIG. 11A, the heat distribution shown by heat signature 1106 of FIG. 11A, the heat distribution shown by heat signature 1122 of FIGS. 11B-11C, the heat distribution shown by heat signature 1126 of FIG. 11B or the heat distribution shown by heat signature 1146 of FIG. 11C.

In operation 404 of method 400, an integrated circuit is manufactured according to the integrated circuit design. In some embodiments, the integrated circuit of method 400 includes at least wafer 102, wafer 200, plurality of integrated circuits 201 or integrated circuit 203. In some embodiments, operation 404 is performed by IC manufacturing system 1500 of FIG. 15.

In operation 406 of method 400, a burn-in test of the integrated circuit and an automated test of the integrated circuit are simultaneously performed. In some embodiments, operation 406 is performed by system 100 of FIG. 1. In some embodiments, the burn-in test of method 400 includes the burn-in test performed by system 100 of FIG. 1, and similar detailed description is omitted. In some embodiments, the automated test of method 400 includes the automated or ATE test performed by system 100 of FIG. 1, similar detailed description is omitted.

Method 400 operates to achieve the benefits discussed above with respect to at least system 100 of FIG. 1, wafer 200 of FIG. 2 or carrier wafer 300 of FIG. 3.

FIG. 5 is a flowchart of a method 500, in accordance with some embodiments.

In some embodiments, method 500 includes operations of method 400 of FIG. 4, and similar detailed description is omitted. For example, in some embodiments, method 500 includes an embodiment of operation 402 and 404 of FIG. 4.

In some embodiments, method 500 is a method of performing a simulation of a heat distribution throughout an integrated circuit design, and a method of manufacturing an integrated circuit according to the integrated circuit design.

In some embodiments, the method of performing the simulation of the heat distribution throughout the integrated circuit design includes operations 502, 504, 506, 508, 510, 514 and 516. In some embodiments, operations 502, 504, 506, 508, 510, 514 and 516 are an embodiment of operation 402 of FIG. 4, and similar detailed description is omitted. In some embodiments, one or more of operations 502, 504, 506, 508, 510, 514 and 516 are performed by system 110 or system 1400 of FIG. 14.

In some embodiments, the method of manufacturing the integrated circuit according to the integrated circuit design includes operation 512. In some embodiments, operation 512 is operation 404 of FIG. 4, and similar detailed description is omitted. In some embodiments, operation 512 is performed by IC manufacturing system 1500 of FIG. 15.

In operation 502 of method 500, a heat range HR of an integrated circuit design is received from a user. In some embodiments, the user of method 500 includes the user of at least system 100, system 110 or system 1400 of FIG. 14. In some embodiments, the heat range HR of method 500 includes the heat range of FIG. 1, and similar detailed description is omitted. In some embodiments, the heat range HR is defined between a minimum heat value Hmin and a maximum heat value Hmax.

In some embodiments, heat values included within the heat range HR are considered as a uniform heat distribution throughout the integrated circuit design. In some embodiments, the integrated circuit design of method 500 includes at least integrated circuit design 700 of FIG. 7, integrated circuit design 900A of FIG. 9A, integrated circuit design 1112 of FIG. 11A, integrated circuit design 1132 of FIGS. 11B-11C, or integrated circuit design 1162 of FIG. 11C.

In some embodiments, the integrated circuit design of method 500 is a design of an integrated circuit, such as at least wafer 102, wafer 200, plurality of integrated circuits 201 or integrated circuit 203.

In operation 504 of method 500, configured power information for a set of circuit blocks and a set of heaters in the integrated circuit design are obtained. In some embodiments, operation 504 of method 500 includes obtaining configured power information for each circuit block of the set of circuit blocks and each heater of the set of heaters in the integrated circuit design.

In some embodiments, the configured power information for the set of circuit blocks and the set of heaters in the integrated circuit design are obtained from a table, such as table 600 of FIG. 6. In some embodiments, table 600 is stored in memory 1404 of FIG. 14. In some embodiments, the configured power information of method 500 includes at least the set of maximum configured power entries 604 of FIG. 6 or set of configured power entries 606 of FIG. 6.

In some embodiments, the set of circuit blocks of the integrated circuit design of method 500 includes at least the set of circuit blocks 704 of FIG. 7 or FIGS. 11A-11C. In some embodiments, the set of circuit blocks of the integrated circuit design of method 500 includes at least circuit block 602a, 602b or 602e of FIG. 6.

In some embodiments, the set of heaters of the integrated circuit design of method 500 includes at least set of heaters 706 of FIG. 7 or heater 1160 of FIG. 11C. In some embodiments, the set of heaters of the integrated circuit design of method 500 includes at least heater 602c or 602d of FIG. 6.

In operation 506 of method 500, location information for the set of circuit blocks and the set of heaters in the integrated circuit design are extracted from a design file (DEF). In some embodiments, operation 506 of method 500 includes extracting location information for each circuit block of the set of circuit blocks and each heater of the set of heaters in the integrated circuit design from the design file. In some embodiments, the design file of method 500 is stored in memory 1404 of FIG. 14.

In some embodiments, the location information for the set of circuit blocks and the set of heaters in the integrated circuit design of method 500 include the positions of each element in the integrated circuit design. In some embodiments, the design file of method 500 includes a design exchange format (DEF) that represents a physical layout of the integrated circuit design. In some embodiments, the DEF is in an American Standard Code for Information Interchange (ASCII) format, and represents a netlist and circuit layout of the integrated circuit design.

In operation 508 of method 500, a heat signature of the integrated circuit design is determined from the configured power information and the location information for the set of circuit blocks and the set of heaters included in the integrated circuit design.

In some embodiments, the heat signature is a two dimensional map of heat values HV arranged throughout the integrated circuit design. In some embodiments, the heat values HV are generated by each circuit block of the set of circuit blocks and each heater of the set of heaters included in the integrated circuit design.

In some embodiments, the heat values HV of the integrated circuit design are determined from formula 2 (described below in FIGS. 8 & 9A-9C). In some embodiments, method 800 of FIG. 8 is an embodiment of operation 508.

In some embodiments, operation 508 of method 500 includes determining the heat signature of the integrated circuit design from the configured power information and the location information for each circuit block of the set of circuit blocks and each heater of the set of heaters included in the integrated circuit design.

In some embodiments, the heat signature of method 500 includes at least heat signature 930 of FIG. 9C, heat signature 1102 of FIG. 11A, heat signature 1106 of FIG. 11A, heat signature 1122 of FIGS. 11B-11C, heat signature 1126 of FIG. 11B or heat signature 1146 of FIG. 11C.

In operation 510 of method 500, a determination is made whether heat values HV of the heat signature of the integrated circuit design are within the heat range HR specified by the user.

In some embodiments, operation 510 includes determining whether heat values HV of the heat signature of the integrated circuit design are equal to or greater than the minimum heat value Hmin and equal to or less than the maximum heat value Hmax.

In some embodiments, if the heat values HV of the heat signature of the integrated circuit design are within the heat range HR specified by the user, then the result of operation 510 is a "yes", and method 500 proceeds to operation 512. In some embodiments, if the heat values HV of the heat signature of the integrated circuit design are within the heat range HR specified by the user, then the heat values HV of the heat signature of the integrated circuit design are sufficient to cause the integrated circuit design to generate a uniform heat distribution, thus indicating that an integrated circuit manufactured based on the integrated circuit design also generates a uniform heat distribution, and the burn-in test of operation 406 performed by system 100 is performed without enabling the heaters of carrier wafer 106.

In some embodiments, if the heat values HV of the heat signature of the integrated circuit design are not within the heat range HR specified by the user, then the result of operation 510 is a "no", and method 500 proceeds to operation 514.

In operation 512 of method 500, an integrated circuit is manufactured according to the integrated circuit design. In some embodiments, the integrated circuit of method 500 includes at least wafer 102, wafer 200, plurality of integrated circuits 201 or integrated circuit 203. In some embodiments, operation 512 is performed by IC manufacturing system 1500 of FIG. 15. In some embodiments, operation 512 is operation 404 of FIG. 4, and similar detailed description is omitted.

In operation 514 of method 500, a determination is made whether a number of iterations of operation 508, 510 or 516 exceeds a user defined limit. In some embodiments, the user defined limit of method 500 includes a maximum number of iterations that at least operation 508, 510 or 516 is performed. In operation 502 of method 500, the user defined limit of method 500 is received from the user.

In some embodiments, if the number of iterations of operation 508, 510 or 516 does not exceed the user defined limit, then the result of operation 514 is a "no", and method 500 proceeds to operation 516. In some embodiments, if the number of iterations of operation 508, 510 or 516 does not exceed the user defined limit, then the heat values HV of the heat signature of the integrated circuit design are insufficient to cause the integrated circuit design to generate a uniform heat distribution, and method 500 attempts to modify the integrated circuit design by operation 516.

In some embodiments, if the number of iterations of operation 508, 510 or 516 exceeds the user defined limit, then the result of operation 514 is a "yes", and method 500 proceeds to operation 512. In some embodiments, if the number of iterations of operation 508, 510 or 516 exceeds the user defined limit, then the heat values HV of the heat signature of the integrated circuit design are insufficient to cause the integrated circuit design to generate a uniform heat distribution, thus indicating that an integrated circuit manufactured based on the integrated circuit design also does not generate a uniform heat distribution, and therefore when the burn-in test of operation 406 performed by system 100 is performed, the heaters of carrier wafer 106 are enabled thereby generating a supplemental heat distribution that when combined with the heat distribution of the integrated circuit is a uniform heat distribution.

In operation 516 of method 500, the integrated circuit design is modified. In some embodiments, the integrated circuit design is modified in response to determining that the heat values HV of the heat signature of the integrated circuit design are not within the heat range HR. In some embodiments, method 1000 of FIG. 10 is an embodiment of operation 516.

In some embodiments, operation 516 includes one or more of adding a new circuit block to the set of circuit blocks, adding a new heater to the set of heaters, removing a first heater from the set of heaters, moving a position of the first heater of the set of heaters, modifying the configured power of a first circuit block of the set of circuit blocks, modifying the configured power of the first heater of the set of heaters or modifying a size of the first heater of the set of heaters.

In some embodiments, the new circuit block or the first circuit block of the set of circuit blocks of method 500 includes one or more circuit blocks similar to the set of circuit blocks 704 of the integrated circuit design. In some embodiments, the new heater or the first heater of the set of heaters of method 500 includes one or more heaters similar to the set of heaters 706 or heater 1160 of FIG. 11C of the integrated circuit design.

In some embodiments, one or more of operations 508, 510, 514 or 516 are repeated thereby causing the integrated circuit design to be modified. In some embodiments, one or more of operations 508, 510, 514 or 516 are repeated until the heat values HV of the heat signature of the integrated circuit design are within the heat range HR specified by the user or the number of iterations of operation 508, 510 or 516 exceeds the user defined limit.

Method 500 operates to achieve the benefits discussed above with respect to at least system 100 of FIG. 1, wafer 200 of FIG. 2 or carrier wafer 300 of FIG. 3.

FIG. 6 is a table 600, in accordance with some embodiments.

Table 600 is a lookup table of parameters of an integrated circuit design, such as integrated circuit design 700 of FIG. 7.

Table 600 is utilized with one or more operations of method 500 of FIG. 5. In some embodiments, method 500 is utilized with lookup table 600. In some embodiments, one or more of operations 502, 504, 506, 508 or 516 of method 500 utilize a lookup table similar to table 600 of FIG. 6. In some embodiments, table 600 is stored in memory 1404 of FIG. 14. In some embodiments, table 600 is generated by system 1400 of FIG. 14.

Table 600 comprises 6 rows and 3 columns. Column 1 comprises a set of IC design elements 602. Column 2 comprises a set of maximum configurable power entries 604 for the corresponding set of IC design elements 602. Column 3 comprises a set of configurable power entries 606 for the corresponding set of IC design elements 602. Each entry in column 1 has a corresponding entry in column 2 and a corresponding entry in column 3.

Other numbers of columns or rows in table 600 are within the scope of the present disclosure.

The set of IC design elements 602 includes at least IC design elements 602a, 602b, 602c, 602d or 602e. The set of IC design elements 602 corresponds to the set of circuit blocks 704 or the set of heaters 706 of the integrated circuit design. IC design elements 602a, 602b and 602e correspond to one or more circuit blocks in the set of circuit blocks 704 of integrated circuit design 700. IC design elements 602c and 602d correspond to one or more heaters in the set of heaters 706 of integrated circuit design 700.

Other numbers of IC design elements in the set of IC design elements 602 are within the scope of the present disclosure. Other numbers of circuit blocks or heaters in the set of IC design elements 602 are within the scope of the present disclosure.

Column 2 comprises a set of maximum configurable power entries 604 corresponding to the set of IC design elements 602. The set of maximum configurable power entries 604 includes at least maximum configurable power entries 604a, 604b, 604c, 604d or 604e. Each maximum configurable power entry 604a, 604b, 604c, 604d or 604e of the set of maximum configurable power entries 604 is the maximum configurable power at which the corresponding IC design element 602a, 602b, 602c, 602d or 602e of the set of IC design elements 602 can operate.

Other numbers or values of maximum configurable power entries in the set of maximum configurable power entries 604 are within the scope of the present disclosure.

Column 3 comprises a set of configurable power entries 606 corresponding to the set of IC design elements 602 or the set of maximum configurable power entries 604.

The set of configurable power entries 606 includes at least configurable power entries 606a, 606b, 606c, 606d or 606e. Each configurable power entry 606a, 606b, 606c, 606d or 606e of the set of configurable power entries 606 is the configurable power that the corresponding IC design element 602a, 602b, 602c, 602d or 602e of the set of IC design elements 602 can operate at (without including the maximum configurable powers of column 2).

Other numbers or values of configurable power entries 606 in the set of configurable power entries 606 are within the scope of the present disclosure.

Configurable power entry 606a includes one or more configurable power entries at which IC design element 602a can operate. For example, configurable power entry 606a includes configurable power entries 6 Watts (W), 4 W and 2 W at which IC design element 602a can operate.

Configurable power entry 606b includes one or more configurable power entries at which IC design element 602b can operate. For example, configurable power entry 606b includes configurable power entries 6 W, 4 W and 2 W at which IC design element 602b can operate.

Configurable power entry 606c includes one or more configurable power entries at which IC design element 602c can operate. For example, configurable power entry 606c includes configurable power entries 1 W and 0.5 W at which IC design element 602c can operate.

Configurable power entry 606d includes one or more configurable power entries at which IC design element 602d can operate. For example, configurable power entry 606d includes configurable power entries 2.5 W and 1.25 W at which IC design element 602d can operate.

Configurable power entry 606d includes one or more configurable power entries at which IC design element 602d can operate. For example, configurable power entry 606d includes configurable power entries 2.5 W and 1.25 W at which IC design element 602d can operate.

Configurable power entry 606e includes one or more configurable power entries at which IC design element 602e can operate. For example, configurable power entry 606e includes configurable power entry 0.25 W at which IC design element 602e can operate.

In some embodiments, during operation 516 of method 500, the integrated circuit design is modified by adjusting (e.g., increasing or decreasing) the configured power of one or more circuit blocks of the set of circuit blocks or one or more heaters of the set of heaters according to the set of maximum configurable power entries 604 and the set of configurable power entries 606 of table 600. For example, in some embodiments, if the heat values HV generated by IC design element 602a with a configurable power entry 606a of 2 W is less than the heat range HR, then the configurable power entry 606a of IC design element 602a can be increased from 2 W to 4 W up to the maximum configurable power entry 604a in column 2.

FIG. 7 is a block diagram of an integrated circuit design 700, in accordance with some embodiments.

Integrated circuit design 700 corresponds to the integrated circuit design associated with table 600 of FIG. 6, and similar detailed description is therefore omitted. In some embodiments, integrated circuit design 700 is an integrated circuit design that corresponds to the set of IC design elements 602 of table 600 of FIG. 6, the set of maximum configurable power entries 604, and the set of configurable power entries 606, and similar detailed description is therefore omitted.

In some embodiments, integrated circuit design 700 is a design of integrated circuit 203 of FIG. 2 or one or more of the integrated circuits of the plurality of integrated circuits 201 of FIG. 2, and similar detailed description is therefore omitted. In some embodiments, integrated circuit design 700 is usable to manufacture integrated circuit 203 of FIG. 2, and similar detailed description is therefore omitted. In some embodiments, integrated circuit design 700 is stored in memory 1404 of FIG. 14. In some embodiments, integrated circuit design 700 is generated by system 1400 of FIG. 14.

Integrated circuit design 700 includes a set of circuit blocks 704 and a set of heaters 706. In some embodiments, set of circuit blocks 704 of integrated circuit design 700 is usable to manufacture set of circuit blocks 204 of integrated circuit 203 of FIG. 2, and similar detailed description is therefore omitted. In some embodiments, set of heaters 706 of integrated circuit design 700 is usable to manufacture set of heaters 206 of integrated circuit 203 of FIG. 2, and similar detailed description is therefore omitted. In some embodiments, the operation of the elements of the integrated circuit design 700 are similar to the corresponding elements of the integrated circuit 203, and similar description is omitted for brevity.

Set of circuit blocks 704 includes at least a CPU 704a, a CPU 704b, a CPU 704c, a CPU 704d, a GPU 704e or a PLL 704f. In some embodiments, at least CPU 704a, CPU 704b, CPU 704c, CPU 704d, GPU 704e or PLL 704f of integrated circuit design 700 is usable to manufacture at least CPU 204a, CPU 204b, CPU 204c, CPU 204d, GPU 204e or PLL 204f of integrated circuit 203 of FIG. 2, and similar detailed description is therefore omitted.

In some embodiments, at least CPU 704a, CPU 704b, CPU 704c, CPU 704d, GPU 704e or PLL 704f of the set of circuit blocks 704 is configured to operate at one or more power levels according to the set of configurable power entries 606 of table 600 or the set of maximum configurable power entries 604 of table 600 thereby generating heat values and the heat signature of the integrated circuit design during execution of operation 402 of method 400.

In some embodiments, at least CPU 204a, CPU 204b, CPU 204c, CPU 204d, GPU 204e or PLL 204f of the set of circuit blocks 204 of FIG. 2 is configured to operate at one or more power levels according to the set of configurable power entries 606 of table 600 or the set of maximum configurable power entries 604 of table 600 thereby generating heat during burn-in testing and ATE testing (e.g., operation 406 of method 400) of integrated circuit 203.

Other numbers of circuits in set of circuit blocks 704 are within the scope of the present disclosure.

Set of heaters 706 includes at least a heater 706a or a heater 706b. In some embodiments, at least heater 706a or heater 706b of integrated circuit design 700 is usable to manufacture at least heater 206a or heater 206b of integrated circuit 203 of FIG. 2, and similar detailed description is therefore omitted.

In some embodiments, at least heater 706a or heater 706b of the set of heaters 706 is configured to operate at one or more power levels according to the set of configurable power entries 606 of table 600 or the set of maximum configurable power entries 604 of table 600 thereby generating heat values and the heat signature of the integrated circuit design during execution of operation 402 of method 400.

In some embodiments, at least heater 206a or heater 206b of the set of heaters 206 of FIG. 2 is configured to operate at one or more power levels according to the set of configurable power entries 606 of table 600 or the set of maximum configurable power entries 604 of table 600 thereby generating heat during burn-in testing and ATE testing (e.g., operation 406 of method 400) of integrated circuit 203.

Other numbers of heaters in set of heaters 706 are within the scope of the present disclosure.

In some embodiments, the set of circuit blocks 704 and the set of heaters 706 are configured as a set of heat sources, and thereby generate a heat signature of integrated circuit design 700 during execution of operation 402 of method 400.

In some embodiments, the set of circuit blocks 704 and the set of heaters 706 are configured to generate a uniform heat distribution throughout integrated circuit design 700. In some embodiments, the set of circuit blocks 704 and the set of heaters 706 are modified to generate a uniform heat distribution throughout integrated circuit design 700 by operating at configured power levels contained in table 600 of FIG. 6.

In some embodiments, the heat distribution throughout integrated circuit design 700 is modified by changing at least positions, number of circuit elements, a size or configured powers of the set of circuit blocks 704 and the set of heaters 706. In some embodiments, at least the positions, number of circuit elements, size or configured powers of the set of circuit blocks 704 and the set of heaters 706 can be adjusted to generate a uniform heat distribution throughout integrated circuit design 700.

In some embodiments, if integrated circuit design 700 has a uniform heat distribution, then an integrated circuit 201, manufactured based on integrated circuit design 700, is useable with system 100 while reducing the number of active (e.g., turned-on) elements in heater chip 108 of FIG. 1 during burn-in testing of integrated circuit 201 or wafer 102. In some embodiments, the number of active elements in heater chip 108 of FIG. 1 during burn-in testing of wafer 102 or integrated circuit 201 based on integrated circuit design 700 is zero.

In some embodiments, if integrated circuit design 700 does not have a uniform heat distribution, then an integrated circuit 201, manufactured based on integrated circuit design 700, is combined with a supplemental heat source (e.g., generated by a number of turned-on or active elements in heater chip 108 of FIG. 1) during burn-in testing of integrated circuit 201 or wafer 102 performed by system 100.

Other configurations of the set of circuit blocks 704 and the set of heaters 706 are within the scope of the present disclosure.

Other configurations of integrated circuit design 700 are within the scope of the present disclosure.

FIG. 8 is a flowchart of a method 800 of determining a heat signature of an integrated circuit design, in accordance with some embodiments.

In some embodiments, method 800 is an embodiment of operation 508 of method 500, and similar detailed description is omitted. In some embodiments, one or more of operations 802, 804, 806 and 808 are performed by system 110 or system 1400 of FIG. 14.

In some embodiments, method 800 is useable to determine a heat signature of an integrated circuit design such as integrated circuit design 700, integrated circuit design 902 of FIG. 9A, integrated circuit design 1112 of FIG. 11A, integrated circuit design 1132 of FIGS. 11B-11C, or integrated circuit design 1162 of FIG. 11C.

In some embodiments, method 800 is useable to determine a heat signature such as heat signature 930 of FIG. 9C, heat signatures 1102 and 1106 of FIG. 11A, heat signatures 1122 and 1126 of FIG. 11B, and heat signatures 1122 and 1146 of FIG. 11C.

In operation 802 of method 800, an integrated circuit design is divided into an array of windows. In some embodiments, the integrated circuit design is divided into the array of windows based on a window size. In some embodiments, the window size is defined by a user. In some embodiments, the window size of window of the array of windows is the same. In some embodiments, the window size ranges from about 1 µm to about 20 µm. Other values of window size are within the scope of the present disclosure.

In some embodiments, the integrated circuit design of method 800 includes at least integrated circuit design 700 of FIG. 7, integrated circuit design 902 of FIG. 9A, integrated circuit design 1112 of FIG. 11A, integrated circuit design 1132 of FIGS. 11B-11C, or integrated circuit design 1162 of FIG. 11C.

In some embodiments, the array of windows of method 800 includes at least the array of windows 901 of FIGS. 9A-9B. In some embodiments, the integrated circuit design 902 of FIG. 9A includes an array of windows 901 that illustrates a non-limiting example of an array of windows after execution of operation 802.

In some embodiments, each window of the array of windows has a square shape. In some embodiments, one or more windows of the array of windows is circular, triangular, rectangular, square, hexagonal, or other geometric shapes. In some embodiments, one or more windows of the array of windows is a polygon. Other shapes of the array of windows are within the scope of the present disclosure.

In operation 804 of method 800, the power value of each window in the array of windows is determined based on power information and location information of the set of circuit blocks and the set of heaters. In some embodiments, operation 804 includes generating an integrated circuit power map similar to integrated circuit power map 900A in FIG. 9A. In some embodiments, the power value of each window of method 800 corresponds to the power consumed by each circuit block or heater within the corresponding window.

In some embodiments, the power information of method 800 includes the configured power information obtained for operation 504 of method 500. In some embodiments, the power information of method 800 includes the set of configured power entries 606 from table 600 or the set of maximum configured power entries 604 from table 600. In some embodiments, the location information of method 800 includes the location information extracted for operation 506 of method 500.

In some embodiments, the set of circuit blocks of the integrated circuit design of method 800 includes at least the set of circuit blocks 704 of FIG. 7 or FIGS. 11A-11C or set of circuit blocks 904 of FIG. 9A. In some embodiments, the set of circuit blocks of the integrated circuit design of method 800 includes at least circuit block 602a, 602b or 602e of FIG. 6.

In some embodiments, the set of heaters of the integrated circuit design of method 800 includes at least set of heaters 706 of FIG. 7, heater 1160 of FIG. 11C or set of heaters 906 of FIG. 9A. In some embodiments, the set of heaters of the integrated circuit design of method 800 includes at least heater 602c or 602d of FIG. 6.

In some embodiments, the power value P of each window (e.g., also referred as "power per window") of method 800 is determined according to formula 1, and is expressed as:

$$P = NE/PE \qquad (1)$$

where NE is the number of elements covered by a first region of the integrated circuit design, and PE is the power consumed by the circuit block or heater within the first region.

A non-limiting exemplary application of formula 1 includes reference to FIG. 9A.

For example, in some embodiments, CPU 904a of FIG. 9A corresponds to the CPU 704a in layout design 700, and occupies region 910 in FIG. 9A. Thus, region 910 occupies or covers 25 total windows, and the power consumed from table 600 for circuit block entry 606a is 2.5 W, and applying formula 1 to these values results in 2.5 W divided by 25 windows, which is equal to 0.1 W per window. As shown in the FIG. 9A, region 910 has a power value P that is equal to 0.1 W (shown in key 920).

In operation 806 of method 800, the total heat value $H_T$ of each window is determined based on the power value P of each window.

In some embodiments, the total heat value $H_T$ of each window of method 800 is determined according to formula 2, and is expressed as:

$$H_T = \Sigma_{j=1}^{m-1} \Sigma_{i=1}^{n-1} k * Pij/Dij \quad (2)$$

where Pij is the power value of the ith and jth indices, k is a constant based on the material of the circuit block or heater, Dij is the distance between the ith and jth window, m is the number of rows in the array of windows, n is the number of columns in array of windows.

In some embodiments, the total heat value $H_T$ of each window of operation 806 is a sum of the heat generated by the corresponding window and the heat generated by each of the other windows in the integrated circuit design. In some embodiments, the total heat value $H_T$ of each window of operation 806 is a sum of the heat generated by the corresponding window and the heat generated by a number of other windows in the integrated circuit design within a defined distance of the current window. In some embodiments, the value of k is based on the semiconductor material within the heater or the circuit block. In some embodiments, the value of k is equal to 1.

A non-limiting exemplary application of formula 2 includes reference to FIG. 9B. For example, integrated circuit design 900B corresponds to circuit block 904 of FIG. 9A, but further includes a region 950, and similar detailed description is omitted. Region 950 includes 4 windows (950a, 950b, 950c and 950d), and determining the total heat value $H_{T11}$ of window 950a includes determining the heat value $H_{11}$ generated by window 950a and the heat values ($H_{21}$, $H_{12}$, $H_{22}$) generated by each of the other windows (950b, 950c, 950d) in region 950 of integrated circuit design 900B. In this example, the region included 4 windows, but other numbers of windows included in the region are within the scope of the present disclosure. Applying formula 2 to the non-limiting example, results in total heat value $H_{T11}$ of window 950a being equal to $H_{T11} = k*(P_{11} + (P_{12}/D_{12}) + (P_{21}/D_{21}) + (P_{22}/D_{22}))$, where the power values $P_{11}$, $P_{12}$, $P_{21}$ and $P_{22}$ are the corresponding power values of the corresponding windows 502a, 502b, 502c and 502d determined in operation 804 and shown as integrated circuit power map 900A in FIG. 9A.

In some embodiments, operation 806 is performed for each circuit block in the set of circuit blocks and each heater in the set of heaters in integrated circuit design thereby determining the total heat value of the integrated circuit design.

In some embodiments, by dividing the integrated circuit design into the array of windows, method 800 can accurately determine the heat generated across each window of the integrated circuit design by accounting for not only the heat generated by each window, but also the effect of the heat generated by each of the other windows in the integrated circuit design.

In operation 808 of method 800, a heat map is populated according to the total heat value of each window thereby generating a heat signature of the integrated circuit design. In some embodiments, operation 808 includes generating a heat map similar to heat map 900C in FIG. 9C.

In some embodiments, operation 808 includes creating a heat map based on at least the location information of each window in the array of windows and the corresponding total heat value of each corresponding window.

In some embodiments, the heat signature of method 800 includes such as heat signature 930 of FIG. 9C, heat signatures 1102 and 1106 of FIG. 11A, heat signatures 1122 and 1126 of FIG. 11B, and heat signatures 1122 and 1146 of FIG. 11C.

Method 800 operates to achieve the benefits discussed above with respect to at least system 100 of FIG. 1, wafer 200 of FIG. 2, carrier wafer 300 of FIG. 3 or method 400 of FIG. 4. FIG. 9A is a diagram of a power map 900A, in accordance with some embodiments.

Power map 900A corresponds to a power map of integrated circuit design 700, and similar detailed description is therefore omitted. In some embodiments, power map 900A is generated by system 1400 while executing operation 804 of FIG. 8.

Power map 900A includes an integrated circuit design 902 and a power key 920 that illustrates the configured power of each element in the integrated circuit design 902. In some embodiments, the power key 920 illustrates the configured power of each circuit block of the set of circuit blocks 904 and each heater of the set of heaters 906.

Integrated circuit design 902 corresponds to integrated circuit design 700, and similar detailed description is therefore omitted. Integrated circuit design 902 is divided into an array of windows 901. In some embodiments, dividing integrated circuit design 902 into an array of windows 901 corresponds to operation 802 of FIG. 8.

Integrated circuit design 902 includes a set of circuit blocks 904 and a set of heaters 906. In some embodiments, set of circuit blocks 904 is corresponding set of circuit blocks 704 of FIG. 7, and set of heaters 906 is corresponding set of heaters 706 of FIG. 7, and similar detailed description is omitted.

Set of circuit blocks 904 includes at least a CPU 904a, a CPU 904b, a CPU 904c, a CPU 904d, a GPU 904e or a PLL 904f. In some embodiments, CPU 904a, CPU 904b, CPU 904c, CPU 904d, GPU 904e or PLL 904f is corresponding CPU 704a, a CPU 704b, a CPU 704c, a CPU 704d, a GPU 704e or a PLL 704f of FIG. 7, and similar detailed description is omitted.

Other numbers of circuits in set of circuit blocks 904 are within the scope of the present disclosure.

Set of heaters 906 includes at least a heater 906a or a heater 906b. In some embodiments, heater 906a or a heater 906b is corresponding heater 706a or heater 706b of FIG. 7, and similar detailed description is omitted. Other numbers of heaters in set of heaters 906 are within the scope of the present disclosure.

Other configurations of power map 900A are within the scope of the present disclosure.

FIG. 9B is a block diagram of an integrated circuit design 900B, in accordance with some embodiments.

Integrated circuit design 900B corresponds to integrated circuit design 902 of FIG. 9A populated with power values $P_{11}$, $P_{12}$, $P_{21}$ and $P_{22}$ in corresponding windows 902a, 902b, 902c and 902d, and similar detailed description is omitted.

In some embodiments, power values $P_{11}$, $P_{12}$, $P_{21}$ and $P_{22}$ in corresponding windows 902a, 902b, 902c and 902d are used by system 1400 while executing operations 804, 806 or 808 of FIG. 8.

Other configurations of integrated circuit design 900B are within the scope of the present disclosure.

FIG. 9C is a diagram of a heat map 900C, in accordance with some embodiments.

Heat map 900C corresponds to a heat map of power map 900A or integrated circuit design 700, and similar detailed description is therefore omitted.

Heat map 900C corresponds to a heat map of integrated circuit design 700 or power map 900A of FIG. 9A, and similar detailed description is therefore omitted. In some embodiments, heat map 900C is generated by system 1400 while executing operation 808 of FIG. 8.

Heat map 900C includes a heat signature 930 of integrated circuit design 902 and a heat key 932 that illustrates the heat of each window in the integrated circuit design 902. In some embodiments, heat map 900C is a 2 dimensional contour map of the heat signature 930 of integrated circuit design 902 according to the heat key 932.

Other configurations of heat map 900C are within the scope of the present disclosure.

FIG. 10 is a flowchart of a method of modifying an integrated circuit design 1000, in accordance with some embodiments.

In some embodiments, method 1000 is an embodiment of operation 516 of method 500, and similar detailed description is omitted. In some embodiments, one or more of operations 1002, 1004, 1006, 1008, 1010 and 1012 are performed by system 110 or system 1400 of FIG. 14.

In some embodiments, method 1000 is useable to modify an integrated circuit design such as integrated circuit design 700, integrated circuit design 902 of FIG. 9A, integrated circuit design 900B of FIG. 9B, integrated circuit design 1112 of FIG. 11A, integrated circuit design 1132 of FIGS. 11B-11C, or integrated circuit design 1162 of FIG. 11C.

In operation 1002 of method 1000, a determination is made whether the maximum heat values of a first portion of the integrated circuit design exceeds the upper limit of the user defined heat range HR.

In some embodiments, the upper limit of the heat range HR of method 1000 includes the maximum heat value Hmax.

In some embodiments, the maximum heat values of the first portion of the integrated circuit design of method 1000 includes the maximum heat values generated by operation 808 that are in the heat map generated by operation 810.

In some embodiments, the integrated circuit design of method 1000 includes at least integrated circuit design 700 of FIG. 7, integrated circuit design 900A of FIG. 9A, integrated circuit design 1112 of FIG. 11A, integrated circuit design 1132 of FIGS. 11B-11C, or integrated circuit design 1162 of FIG. 11C.

In some embodiments, the first portion of the integrated circuit design of method 1000 includes any portion of integrated circuit design that satisfies the condition of operation 1002. In some embodiments, the first portion of the integrated circuit design of method 1000 is also referred to as "hot spot regions."

In some embodiments, if the maximum heat values of the first portion of the integrated circuit design exceeds the upper limit of the user defined heat range HR, thus indicating that the heat values HV of the heat signature of the integrated circuit design exceed the upper limit of the heat range HR specified by the user, then the result of operation 1002 is a "yes", and method 1000 proceeds to operation 1004.

In some embodiments, if the maximum heat values of the first portion of the integrated circuit design do not exceed the upper limit of the user defined heat range HR, thus indicating that the heat values HV of the heat signature of the integrated circuit design do not exceed the upper limit of the heat range HR specified by the user, then the result of operation 1002 is a "no", and method 1000 proceeds to operation 1006.

In operation 1004 of method 1000, the power of circuit blocks or heaters in the first portion of the integrated circuit design is reduced.

In some embodiments, the power of circuit blocks or heaters in the first portion of the integrated circuit design of operation 1004 are reduced according to the set of power entries 604 or the set of power entries 606 contained in table 600 of FIG. 6.

In some embodiments, if more than one heater or circuit block blocks are in a hot spot region, then operation 1004 comprises reducing at least the power of heaters or the power of circuit blocks that occupy or cover more area in the hot spot region 1114b (FIG. 11A). For example, in FIG. 11A, both heater 706b and CPU 704d are in hot spot region 1114b, and the power of CPU 704d is reduced by operation 1004 since CPU 704d occupies more area than heater 706b in the hot spot region 1114b.

In some embodiments, if no heater or circuit block are in the hot spot region, then operation 1004 comprises reducing at least the power of heaters or the power of circuit blocks that are separated from the first hot spot region by a lowest distance.

In operation 1006 of method 1000, a determination is made whether the minimum heat values of a second portion of the integrated circuit design is less than the lower limit of the user heat range.

In some embodiments, the lower limit of the heat range HR of method 1000 includes the minimum heat value Hmin.

In some embodiments, the minimum heat values of the second portion of the integrated circuit design of method 1000 includes the minimum heat values generated by operation 808 that are in the heat map generated by operation 810.

In some embodiments, the second portion of the integrated circuit design of method 1000 includes any portion of integrated circuit design that satisfies the condition of operation 1006. In some embodiments, the second portion of the integrated circuit design of method 1000 is also referred to as "cold spot regions."

In some embodiments, if the minimum heat values of the second portion of the integrated circuit design are less than the lower limit of the user defined heat range HR, thus indicating that the heat values HV of the heat signature of the integrated circuit design are less than the lower limit of the heat range HR specified by the user, then the result of operation 1006 is a "yes", and method 1000 proceeds to operation 1008.

In some embodiments, if the minimum heat values of the second portion of the integrated circuit design are not less than the lower limit of the user defined heat range HR, thus indicating that the heat values HV of the heat signature of the integrated circuit design are not less than the lower limit of the heat range HR specified by the user, then the result of operation 1006 is a "no", and method 1000 proceeds to operation 508.

In operation 1008 of method 1000, a determination is made whether the power of circuit blocks or heaters in the second portion of the integrated circuit design is at maximum power.

In some embodiments, operation 1008 includes determining whether the power of circuit blocks or heaters in the "cold spot regions" of the integrated circuit design are at maximum power.

In some embodiments, if the power of circuit blocks or heaters in the second portion of the integrated circuit design are at maximum power, thus indicating that the power values of circuit blocks or heaters in the second portion of the integrated circuit design cannot be further increased, then the result of operation 1008 is a "yes", and method 1000 proceeds to operation 1010.

In some embodiments, if the power of circuit blocks or heaters in the second portion of the integrated circuit design are not at maximum power, thus indicating that the power values of circuit blocks or heaters in the second portion of the integrated circuit design can be further increased, then the result of operation 1008 is a "no", and method 1000 proceeds to operation 1012.

In operation 1010 of method 1000, at least a heater is inserted in the second portion of the integrated circuit design. In some embodiments, the inserted heater of method 1000 includes heater 1160 of FIG. 11C.

In some embodiments, operation 1010 includes inserting at least a heater in first cold spot regions of the integrated circuit design.

In operation 1012 of method 1000, power of circuit blocks or heaters in the second portion of the integrated circuit design are increased. In some embodiments, a heater with power that is increased by operation 1012 includes heater 706a in FIG. 11B.

Method 1000 operates to achieve the benefits discussed above with respect to at least system 100 of FIG. 1, wafer 200 of FIG. 2, carrier wafer 300 of FIG. 3, method 400 of FIG. 4 or FIGS. 5-11C.

FIG. 11A is a diagram 1100A of power maps and an integrated circuit design, in accordance with some embodiments.

Diagram 1100A includes heat map 1102, heat map 1106 and integrated circuit design 1112.

In some embodiments, integrated circuit design 1112 corresponds to integrated circuit design 700, and heat map 1102 corresponds to heat map 900C of FIG. 9C, and similar detailed description is therefore omitted.

Heat map 1102 corresponds to a heat map of integrated circuit design 1112, and similar detailed description is therefore omitted. In some embodiments, heat maps 1102 and 1106 are generated by system 1400 while executing operation 804 of FIG. 8.

Heat map 1106 corresponds to a heat map of integrated circuit design 1112 after execution of operation 1004 of FIG. 10, and similar detailed description is therefore omitted.

Heat map 1102 includes hot spot region 1104a and hot spot region 1104b. Hot spot region 1104a corresponds to region 1114a of integrated circuit design 1112 and hot spot region 1104b corresponds to region 1114b of integrated circuit design 1112.

Region 1114a of integrated circuit design 1112 covers CPU 704c. Region 1114b of integrated circuit design 1112 covers part of CPU 704d and heater 706b.

Heat map 1106 includes hot spot region 1108a and hot spot region 1108b. Hot spot region 1108a corresponds to hot spot region 1104a after execution of operation 1004, and hot spot region 1108b corresponds to hot spot region 1104b after execution of operation 1004.

For example, in some embodiments, during execution of operation 1004, CPU 704c is in region 1114a that corresponds to hot spot region 1104a, and the power of CPU 704c is reduced by operation 1004 thereby generating hot spot region 1108a of heat map 1106.

For example, in some embodiments, during execution of operation 1004, both heater 706b and CPU 704d are in region 1114b that corresponds to hot spot region 1104b, and the power of CPU 704d is reduced by operation 1004 since CPU 704d occupies more area than heater 706b in region 1114b thereby generating hot spot region 1108b of heat map 1106.

Other configurations of diagram 1100A are within the scope of the present disclosure.

FIG. 11B is a diagram 1100B of power maps and an integrated circuit design, in accordance with some embodiments.

Diagram 1100B includes heat map 1122, heat map 1126 and integrated circuit design 1132.

In some embodiments, integrated circuit design 1132 corresponds to integrated circuit design 700, and heat map 1122 corresponds to heat map 900C of FIG. 9C, and similar detailed description is therefore omitted.

Heat map 1122 corresponds to a heat map of integrated circuit design 1132, and similar detailed description is therefore omitted. In some embodiments, heat maps 1122 and 1126 are generated by system 1400 while executing operation 804 of FIG. 8.

Heat map 1126 corresponds to a heat map of integrated circuit design 1132 after execution of operation 1012 of FIG. 10, and similar detailed description is therefore omitted.

Heat map 1122 includes cold spot region 1124a. Cold spot region 1124a corresponds to region 1134a of integrated circuit design 1132.

Region 1134a of integrated circuit design 1132 corresponds to CPU 704c.

Heat map 1126 includes cold spot region 1128a. Cold spot region 1128a corresponds to cold spot region 1124a after execution of operation 1012. For example, in some embodiments, during execution of operation 1012, heater 706a is in region 1134a that corresponds to cold spot region 1124a, and the power of heater 706a is increased by operation 1012 thereby generating cold spot region 1128a of heat map 1126.

Other configurations of diagram 1100B are within the scope of the present disclosure.

FIG. 11C is a diagram 1100C of power maps and an integrated circuit design, in accordance with some embodiments.

Diagram 1100C includes heat map 1122, heat map 1146, integrated circuit design 1132 and integrated circuit design 1162.

In some embodiments, integrated circuit design 1132 corresponds to integrated circuit design 700, and heat map 1122 corresponds to heat map 900C of FIG. 9C, and similar detailed description is therefore omitted.

Heat map 1122 corresponds to a heat map of integrated circuit design 1132, and similar detailed description is therefore omitted. In some embodiments, heat maps 1122 and 1146 are generated by system 1400 while executing operation 804 of FIG. 8.

Heat map 1146 corresponds to a heat map of integrated circuit design 1162, and the integrated circuit design 1162 and corresponding heat map 1146 are generated after execution of operation 1010 of FIG. 10, and similar detailed description is therefore omitted.

Heat map 1122 includes cold spot region 1144a. Cold spot region 1144a corresponds to region 1154a of integrated circuit design 1132.

Region 1154a of integrated circuit design 1132 does not include a circuit block or heater in integrated circuit design 1132.

Heat map 1146 includes cold spot region 1148a. Cold spot region 1148a corresponds to cold spot region 1144a after execution of operation 1010. For example, in some embodiments, during execution of operation 1010, no heater is in region 1154a of integrated circuit design 1132, so system 1400 inserts new heater 1160 into region 1164a of integrated circuit design 1132, and region 1164a corresponds to cold spot region 1148a of heat map 1146.

Other configurations of diagram 1100C are within the scope of the present disclosure.

FIG. 12 is a flowchart of a method 1200 of simultaneously performing a burn-in test of the integrated circuit and an automated test of the integrated circuit, in accordance with some embodiments.

In some embodiments, method 1200 is an embodiment of operation 408 of method 400, and similar detailed description is omitted. In some embodiments, one or more of operations 1202, 1204 and 1206 are performed by system 100 or system 1400 of FIG. 14. In some embodiments, method 1200 is useable to simultaneously perform a burn-in test of the integrated circuit and an automated test of the integrated circuit.

In operation 1202 of method 1200, a set of circuit blocks and a first set of heaters are configured as a first set of heat sources for the burn-in test of the integrated circuit thereby generating a first heat signature of the integrated circuit.

In some embodiments, operation 1202 comprises turning on the set of circuit blocks and the first set of heaters according to simulated design power levels corresponding to the integrated circuit design thereby generating the first heat signature.

In some embodiments, the integrated circuit of method 1200 includes at least wafer 102, wafer 200, plurality of integrated circuits 201 or integrated circuit 203.

In some embodiments, the integrated circuit design of method 1200 includes at least integrated circuit design 700 of FIG. 7, integrated circuit design 902 of FIG. 9A, integrated circuit design 1112 of FIG. 11A, integrated circuit design 1132 of FIGS. 11B-11C, or integrated circuit design 1162 of FIG. 11C.

In some embodiments, the set of circuit blocks of the integrated circuit of method 1200 includes at least the set of circuit blocks 204 of FIG. 2.

In some embodiments, the first set of heaters of the integrated circuit of method 1200 includes at least set of heaters 206 of FIG. 2.

In some embodiments, the simulated design power levels of method 1200 includes at least one or more power entries 604 or 606 contained in table 600.

In operation 1204 of method 1200, the integrated circuit is placed on a carrier wafer. In some embodiments, the carrier wafer of method 1200 includes carrier wafer 106 of FIG. 1 and carrier wafer 300 of FIG. 3.

In operation 1206 of method 1200, at least a portion of the carrier wafer is configured as a second set of heat sources for the burn-in test of the integrated circuit thereby generating a second heat signature of the integrated circuit.

In some embodiments, the at least a portion of the carrier wafer of method 1200 includes at least region 302 of FIG. 3, one or more of the plurality of integrated circuit dies 301, integrated circuit die 303 or at least a die of the set of circuit dies 304.

In some embodiments, operation 1206 comprises turning on the second set of heaters thereby generating the second heat signature corresponding to the second set of heat sources for the burn-in test of the integrated circuit.

In some embodiments, the at least second set of heaters of method 1200 includes the heater chip 108 of FIG. 1, at least a heater of the set of heaters 306, heater 1300 of FIG. 13 or at least a portion of interconnect 1302a of FIG. 13 or interconnect 1302b of FIG. 13.

In some embodiments, the first heat signature of the integrated circuit of method 1200 corresponds to the burn-in heat distribution of the integrated circuit, and the heaters in the second set of heaters are turned off.

In some embodiments, the first heat signature of the integrated circuit and the second heat signature of method 1200 correspond to the burn-in heat distribution of the integrated circuit, and at least one heater in the second set of heaters is turned on.

Method 1200 operates to achieve the benefits discussed above with respect to at least system 100 of FIG. 1, wafer 200 of FIG. 2, carrier wafer 300 of FIG. 3, method 400 of FIG. 4 or FIGS. 5-11C.

FIG. 13 is a cross-sectional view of a heater 1300, in accordance with some embodiments. In some embodiments, heater 1300 is an embodiment of heater chip 108 in FIG. 1 or a heater of the set of heaters 306 in FIG. 3, and similar detailed description is omitted.

Heater 1300 is useable as a heater in heater chip 108 in FIG. 1 or a heater of the set of heaters 306 in FIG. 3.

Heater 1300 includes an interconnect 1302a and an interconnect 1302b in one or more layers of a die 1304. In some embodiments, die 1304 corresponds to one or more dies in set of dies 304 of FIG. 3, and similar detailed description is omitted.

Interconnects 1302a and 1302b each include one or more conductive features, such as conductive lines (not labelled), vias (not labelled), or conductive pads (not labelled), formed in an insulating material 1310. In some embodiments, the one or more conductive features, such as the conductive lines (not labelled), the vias (not labelled), or the conductive pads (not labelled), formed in insulating material 1310 of interconnect structure 1302a and 1302b is referred to as one or more redistribution layers (RDL) of die 1304. The routings of the conductive features shown in FIG. 13 are merely examples. Other configurations, arrangements and materials of the conductive features of interconnect structures 1302a and 1302b are within the contemplated scope of the present disclosure. Other configurations, arrangements and materials of interconnect structures 1302a and 1302b are within the contemplated scope of the present disclosure.

In some embodiments, interconnects 1302a and 1302b are configured to generate heat and function as 2 different stages of corresponding heat sources when electrical current passes through the corresponding interconnects 1302a and 1302b. In some embodiments, the amount of heat generated by interconnects 1302a and 1302b can be adjusted by changing the amount of current passing through corresponding interconnects 1302a and 1302b. In some embodiments, the amount of heat generated by interconnects 1302a and 1302b can be adjusted by selecting a different number of stages of interconnects 1302a and 1302b.

In some embodiments, at least interconnect structure 1302a or 1302b is made of conductive materials, such as copper, copper alloy, aluminum, alloys or combinations thereof. In some embodiments, other applicable materials are used. In some embodiments, at least interconnect structure 1302a or 1302b include other conductive materials, such as tungsten (W), Cu, Al, or AlCu. In some embodiments, insulating material 1310 is made of silicon oxide. In some embodiments, insulating material 1310 includes multiple dielectric layers of dielectric materials. One or more of the multiple dielectric layers are made of low dielectric constant (low-k) materials.

FIG. 13 shows two interconnects or stages, but other numbers of stages of interconnects 1302a and 1302b and corresponding current values passing through interconnects 1302a and 1302b are within the scope of the present disclosure.

Heater 1300 further includes an under bump metallurgy (UBM) layer 1312 on a surface of the interconnect structure 1302a and 1302b. In some embodiments, the UBM layer includes one or more conductive portions 1312a, 1312b, ..., 1312f where f is an integer corresponding to the number of conductive portions in the UBM layer 1312. In some embodiments, UBM layer 1312 is formed on the surface of the interconnect structure 1302a and 1302b. In some embodiments, UBM layer 1312 is formed on a metal pad (not shown). In some embodiments, UBM layer 1312 includes an adhesion layer and/or a wetting layer. In some embodiments, UBM layer 1312 includes at least a copper seed layer. In some embodiments, UBM layer 1312 includes titanium (Ti), titanium nitride (TiN), tantalum nitride (TaN), tantalum (Ta), or the like. Other configurations, arrangements and materials of UBM layer 1312 are within the contemplated scope of the present disclosure.

Integrated circuit 1300 further includes a set of solder bumps 1314 on the UBM layer 1312.

The set of solder bumps 1314 includes one or more solder bumps 1314a, 1314b, ..., 1314f, where f is an integer corresponding to the number of solder bumps in the set of solder bumps 1314. In some embodiments, the set of solder bumps 1314 is formed over UBM layer 1312. In some embodiments, one or more solder bumps 1314a, 1314b, ..., 1314f of the set of solder bumps 1314 includes a conductive material having a low resistivity, such as solder or a solder alloy. In some embodiments, a solder alloy includes Sn, Pb, Ag, Cu, Ni, Bi, or combinations thereof. Other configurations, arrangements and materials of the set of solder bumps 1314 are within the contemplated scope of the present disclosure.

In some embodiments, the set of solder bumps 1314 is electrically connected to one or more other package structures (not shown) by the set of bumps 1314.

Other configurations, arrangements and materials of heater 1300 are within the contemplated scope of the present disclosure.

FIG. 14 is a schematic view of a system 1400 for designing an IC layout design, simulating an IC design, and manufacturing an IC circuit in accordance with some embodiments. In some embodiments, system 1400 generates or places one or more IC layout designs described herein, tests one or more IC designs based on the IC layout design and manufactures an IC based on the layout design. In some embodiments, system 1400 is system 110 in FIG. 1, and similar detailed description is therefore omitted.

System 1400 includes a hardware processor 1402 and a non-transitory, computer readable storage medium 1404 (e.g., memory 1404) encoded with, i.e., storing, the computer program code 1406, i.e., a set of executable instructions 1406. In some embodiments, computer readable storage medium 1404 is configured for interfacing with manufacturing machines for producing the integrated circuit. In some embodiments, computer readable storage medium 1404 is configured for interfacing with wafer 102, test circuit board 104, carrier wafer 106, heater chip 108 for testing the integrated circuit. In some embodiments, computer readable storage medium 1404 is configured to generated and simulate the integrated circuit design.

The processor 1402 is electrically coupled to the computer readable storage medium 1404 via a bus 1408. The processor 1402 is also electrically coupled to an I/O interface 1410 by bus 1408. A network interface 1412 is also electrically connected to the processor 1402 via bus 1408. Network interface 1412 is connected to a network 1414, so that processor 1402 and computer readable storage medium 1404 are capable of connecting to external elements via network 1414. The processor 1402 is configured to execute the computer program code 1406 encoded in the computer readable storage medium 1404 in order to cause system 1400 to be usable for performing a portion or all of the operations as described in at least method 400, 500, 800, 1000 or 1200.

In some embodiments, the processor 1402 is a central processing unit (CPU), a multi-processor, a distributed processing system, an application specific integrated circuit (ASIC), and/or a suitable processing unit.

In some embodiments, the computer readable storage medium 1404 is an electronic, magnetic, optical, electromagnetic, infrared, and/or a semiconductor system (or apparatus or device). For example, the computer readable storage medium 1404 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1404 includes a compact disk-read only memory (CD-ROM), a compact disk-read/write (CD-R/W), and/or a digital video disc (DVD).

In some embodiments, the storage medium 1404 stores the computer program code 1406 configured to cause system 1400 to perform at least method 400, 500, 800, 1000 or 1200. In some embodiments, the storage medium 1404 also stores information needed for performing at least method 400, 500, 800, 1000 or 1200 as well as information generated during performing at least method 400, 500, 800, 1000 or 1200, such as IC design 1416, user interface 1418, IC design simulation 1422, simulation parameters 1424, test parameters 1426, lookup table 1428 and maps 1430, and/or a set of executable instructions to perform the operation of at least method 400, 500, 800, 1000 or 1200. In some embodiments, IC design 1416 comprises one or more of layout patterns of wafer 200, integrated circuit design 700, 900A-900B, 1112, 1132 or 1162.

In some embodiments, IC design 1416 includes at least integrated circuit design 700 of FIG. 7, integrated circuit design 902 of FIG. 9A, integrated circuit design 1112 of FIG. 11A, integrated circuit design 1132 of FIGS. 11B-11C, or integrated circuit design 1162 of FIG. 11C.

In some embodiments, IC design simulation 1422 includes computer code configured to perform one or more portions of at least method 400, 500, 800, 1000 or 1200.

In some embodiments, simulation parameters 1424 includes at least a number of iterations of method 500 as defined by one or more users, one or more heat parameters or one or more power parameters of one or more of FIGS. 1-13. In some embodiments, one or more heat parameters include at least heat distribution, one or more heat ranges from user(s), one or more heat signatures, one or more heat values, one or more total heat values in one or more of FIGS. 1-13. In some embodiments, one or more power parameters include at least power information from table 600, power information or one or more power values of each window of array of windows in one or more of FIGS. 1-13.

In some embodiments, test parameters 1426 includes at least burn-in testing parameters and ATE testing parameters in one or more of FIGS. 1-13.

In some embodiments, lookup table 1428 includes at least table 600, power information, or location information in one or more of FIGS. 1-13. In some embodiments, lookup table 1428 includes the design file of method 500.

In some embodiments, maps 1430 includes at least one or more heat maps, one or more power maps, one or more hot spots, one or more cold spots or one or more array of windows in one or more of FIGS. 1-13.

In some embodiments, the storage medium 1404 stores instructions (e.g., computer program code 1406) for interfacing with manufacturing machines. The instructions (e.g., computer program code 1406) enable processor 1402 to generate manufacturing instructions readable by the manufacturing machines to effectively implement at least method 400, 500, 800, 1000 or 1200 during a manufacturing process.

System 1400 includes I/O interface 1410. I/O interface 1410 is coupled to external circuitry. In some embodiments, I/O interface 1410 includes a keyboard, keypad, mouse, trackball, trackpad, and/or cursor direction keys for communicating information and commands to processor 1402.

System 1400 also includes network interface 1412 coupled to the processor 1402. Network interface 1412 allows system 1400 to communicate with network 1414, to which one or more other computer systems are connected. Network interface 1412 includes wireless network interfaces such as BLUETOOTH, WIFI, WIMAX, GPRS, or WCDMA; or wired network interface such as ETHERNET, USB, or IEEE-1494. In some embodiments, at least method 400, 500, 800, 1000 or 1200 is implemented in two or more systems 1400, and information such as IC design, user interface, IC design simulation, simulation parameters, test parameters, lookup table and maps are exchanged between different systems 1400 by network 1414.

System 1400 is configured to receive information related to an IC or layout design through I/O interface 1410 or network interface 1412. The information is transferred to processor 1402 by bus 1408 to determine an IC design for producing at least wafer 102, wafer 200, plurality of integrated circuits 201 or integrated circuit 203. The IC design is then stored in computer readable medium 1404 as IC design 1416. System 1400 is configured to receive information related to a user interface through I/O interface 1410 or network interface 1412. The information is stored in computer readable medium 1404 as user interface 1418. System 1400 is configured to receive information related to an IC design simulation through I/O interface 1410 or network interface 1412. The information is stored in computer readable medium 1404 as IC design simulation 1422. System 1400 is configured to receive information related to simulation parameters through I/O interface 1410 or network interface 1412. The information is stored in computer readable medium 1404 as simulation parameters 1424. System 1400 is configured to receive information related to test parameters through I/O interface 1410 or network interface 1412. The information is stored in computer readable medium 1404 as test parameters 1426. System 1400 is configured to receive information related to lookup table through I/O interface 1410 or network interface 1412. The information is stored in computer readable medium 1404 as lookup table 1428. System 1400 is configured to receive information related to maps through I/O interface 1410 or network interface 1412. The information is stored in computer readable medium 1404 as maps 1430.

In some embodiments, at least portions of one or more of method 400, 500, 800, 1000 or 1200 is implemented as a standalone software application for execution by a processor. In some embodiments, at least portions of one or more of method 400, 500, 800, 1000 or 1200 is implemented as a software application that is a part of an additional software application. In some embodiments, at least portions of one or more of method 400, 500, 800, 1000 or 1200 is implemented as a plug-in to a software application. In some embodiments, at least portions of one or more of method 400, 500, 800, 1000 or 1200 is implemented as a software application that is a portion of an EDA tool. In some embodiments, at least portions of one or more of method 400, 500, 800, 1000 or 1200 is implemented as a software application that is used by an EDA tool. In some embodiments, the EDA tool is used to generate a layout design of an integrated circuit device, generate and simulate of an integrated circuit design of an IC device or perform testing of the IC device. In some embodiments, the layout design, IC design and simulation and testing parameters are stored on a non-transitory computer readable medium. In some embodiments, the layout is generated using a tool such as VIRTUOSO® available from CADENCE DESIGN SYSTEMS, Inc., or another suitable layout generating tool. In some embodiments, the layout is generated based on a netlist which is created based on the schematic design. In some embodiments, at least portions of one or more of method 400, 500, 800, 1000 or 1200 is implemented by a manufacturing device to manufacture an integrated circuit using a set of masks manufactured based on one or more layout designs generated by system 1400. In some embodiments, system 1400 is a manufacturing device to manufacture an integrated circuit using a set of masks manufactured based on one or more layout designs of the present disclosure.

In some embodiments, system 1400 of FIG. 14 operates to achieve the benefits discussed above with respect to at least system 100 of FIG. 1, wafer 200 of FIG. 2, carrier wafer 300 of FIG. 3, method 400 of FIG. 4 or FIGS. 5-13.

Figure 15:
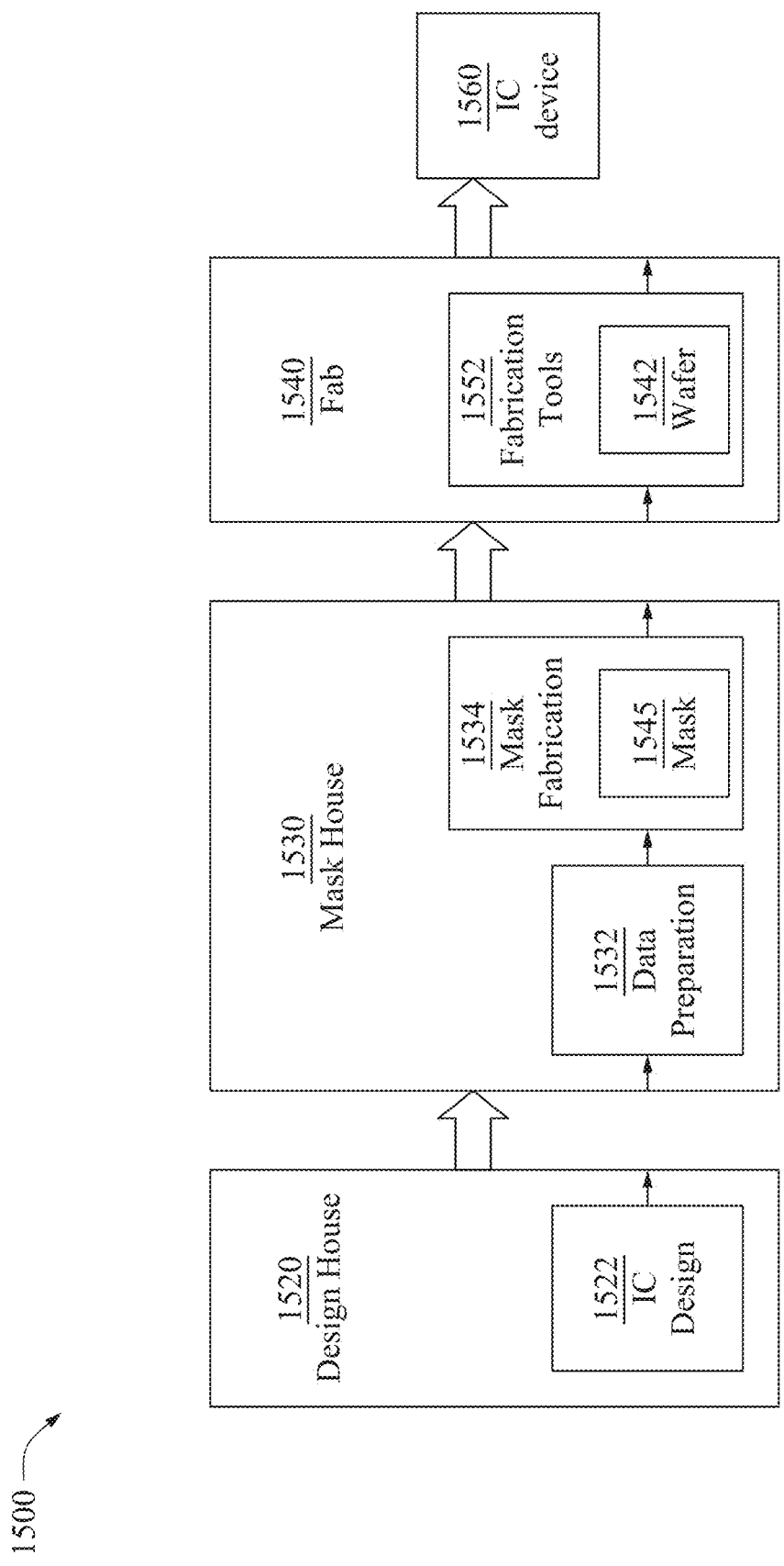
FIG. 15 is a block diagram of an IC manufacturing system, and an IC manufacturing flow associated therewith, in accordance with at least one embodiment of the present disclosure.

FIG. 15 is a block diagram of an integrated circuit (IC) manufacturing system 1500, and an IC manufacturing flow associated therewith, in accordance with at least one embodiment of the present disclosure. In some embodiments, based on a layout diagram, at least one of (A) one or more semiconductor masks or (B) at least one component in a layer of a semiconductor integrated circuit is fabricated using manufacturing system 1500.

In FIG. 15, IC manufacturing system 1500 (hereinafter "system 1500") includes entities, such as a design house 1520, a mask house 1530, and an IC manufacturer/fabricator ("fab") 1540, that interact with one another in the design, development, and manufacturing cycles and/or services related to manufacturing an IC device 1560. The entities in system 1500 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, one or more of design house 1520, mask house 1530, and IC fab 1540 is owned by a single larger company. In some embodiments, one or more of design house 1520, mask house 1530, and IC fab 1540 coexist in a common facility and use common resources.

Design house (or design team) 1520 generates an IC design layout 1522. IC design layout 1522 includes various geometrical patterns designed for an IC device 1560. The geometrical patterns correspond to patterns of metal, oxide, or semiconductor layers that make up the various components of IC device 1560 to be fabricated. The various layers combine to form various IC features. For example, a portion of IC design layout 1522 includes various IC features, such as an active region, gate electrode, source electrode and drain electrode, metal lines or vias of an interlayer interconnection, and openings for bonding pads, to be formed in a semiconductor substrate (such as a silicon wafer) and various material layers disposed on the semiconductor substrate. Design house 1520 implements a proper design procedure to form IC design layout 1522. The design procedure includes one or more of logic design, physical design or place and route. IC design layout 1522 is presented in one or more data files having information of the geometrical patterns. For example, IC design layout 1522 can be expressed in a GDSII file format or DFII file format. In some embodiments, IC design layout 1522 includes at least integrated circuit design 700 of FIG. 7, integrated circuit design 902 of FIG. 9A, integrated circuit design 1112 of FIG. 11A, integrated circuit design 1132 of FIGS. 11B-11C, or integrated circuit design 1162 of FIG. 11C.

Mask house 1530 includes data preparation 1532 and mask fabrication 1534. Mask house 1530 uses IC design layout 1522 to manufacture one or more masks 1545 to be used for fabricating the various layers of IC device 1560 according to IC design layout 1522. Mask house 1530 performs mask data preparation 1532, where IC design layout 1522 is translated into a representative data file ("RDF"). Mask data preparation 1532 provides the RDF to mask fabrication 1534. Mask fabrication 1534 includes a mask writer. A mask writer converts the RDF to an image on a substrate, such as a mask (reticle) 1545 or a semiconductor wafer 1542. The design layout 1522 is manipulated by mask data preparation 1532 to comply with particular characteristics of the mask writer and/or requirements of IC fab 1540. In FIG. 15, mask data preparation 1532 and mask fabrication 1534 are illustrated as separate elements. In some embodiments, mask data preparation 1532 and mask fabrication 1534 can be collectively referred to as mask data preparation.

In some embodiments, mask data preparation 1532 includes optical proximity correction (OPC) which uses lithography enhancement techniques to compensate for image errors, such as those that can arise from diffraction, interference, other process effects and the like. OPC adjusts IC design layout 1522. In some embodiments, mask data preparation 1532 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1532 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during mask fabrication 1534, which may undo part of the modifications performed by OPC in order to meet mask creation rules.

In some embodiments, mask data preparation 1532 includes lithography process checking (LPC) that simulates processing that will be implemented by IC fab 1540 to fabricate IC device 1560. LPC simulates this processing based on IC design layout 1522 to create a simulated manufactured device, such as IC device 1560. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout 1522.

It should be understood that the above description of mask data preparation 1532 has been simplified for the purposes of clarity. In some embodiments, data preparation 1532 includes additional features such as a logic operation (LOP) to modify the IC design layout according to manufacturing rules. Additionally, the processes applied to IC design layout 1522 during data preparation 1532 may be executed in a variety of different orders.

After mask data preparation 1532 and during mask fabrication 1534, a mask 1545 or a group of masks 1545 are fabricated based on the modified IC design layout 1522. In some embodiments, mask fabrication 1534 includes performing one or more lithographic exposures based on IC design layout 1522. In some embodiments, an electron-beam (e-beam) or a mechanism of multiple e-beams is used to form a pattern on a mask (photomask or reticle) 1545 based on the modified IC design layout 1522. The mask 1545 can be formed in various technologies. In some embodiments, the mask 1545 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary version of mask 1545 includes a transparent substrate (e.g., fused quartz) and an opaque material (e.g., chromium) coated in the opaque regions of the binary mask. In another example, the mask 1545 is formed using a phase shift technology. In the phase shift mask (PSM) version of mask 1545, various features in the pattern formed on the mask are configured to have proper phase difference to enhance the resolution and imaging quality. In various examples, the phase shift mask can be attenuated PSM or alternating PSM. The mask(s) generated by mask fabrication 1534 is used in a variety of processes. For example, such a mask(s) is used in an ion implantation process to form various doped regions in the semiconductor wafer, in an etching process to form various etching regions in the semiconductor wafer, and/or in other suitable processes.

IC fab 1540 is an IC fabrication entity that includes one or more manufacturing facilities for the fabrication of a variety of different IC products. In some embodiments, IC Fab 1540 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry entity.

IC fab 1540 includes wafer fabrication tools 1552 (hereinafter "fabrication tools 1552") configured to execute various manufacturing operations on semiconductor wafer 1542 such that IC device 1560 is fabricated in accordance with the mask(s), e.g., mask 1545. In various embodiments, fabrication tools 1552 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1540 uses mask(s) 1545 fabricated by mask house 1530 to fabricate IC device 1560. Thus, IC fab 1540 at least indirectly uses IC design layout 1522 to fabricate IC device 1560. In some embodiments, a semiconductor wafer 1542 is fabricated by IC fab 1540 using mask(s) 1545 to form IC device 1560. In some embodiments, the IC fabrication includes performing one or more lithographic exposures based at least indirectly on IC design layout 1522. Semiconductor wafer 1542 includes a silicon substrate or other proper substrate having material layers formed thereon. Semiconductor wafer 1542 further includes one or more of various doped regions, dielectric features, multilevel interconnects, and the like (formed at subsequent manufacturing steps).

In some embodiments, IC device 1560 includes at least wafer 102, wafer 200, plurality of integrated circuits 201 or integrated circuit 203.

System 1500 is shown as having design house 1520, mask house 1530 or IC fab 1540 as separate components or entities. However, it is understood that one or more of design house 1520, mask house 1530 or IC fab 1540 are part of the same component or entity.

Details regarding an integrated circuit (IC) manufacturing system (e.g., system 1500 of FIG. 15), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

One aspect of this description relates to a method of testing an integrated circuit on a test circuit board. In some embodiments, the method includes performing, by a processor, a simulation of a first heat distribution throughout an integrated circuit design, the integrated circuit design corresponding to the integrated circuit. In some embodiments, the performing the simulation includes determining a heat signature of the integrated circuit design from at least configured power information or location information for each circuit block of the set of circuit blocks or each heater of the set of heaters included in the integrated circuit design, the heat signature including heat values distributed throughout the integrated circuit design. In some embodiments, the performing the simulation further includes simultaneously performing a burn-in test of the integrated circuit and an automated test of the integrated circuit, the integrated circuit being coupled to the test circuit board, wherein the burn-in test has at least one of a minimum burn-in temperature of the integrated circuit or a burn-in heat distribution across the integrated circuit.

Another aspect of this description relates to a method of testing an integrated circuit on a test circuit board. In some embodiments, the method includes performing, by a processor, a simulation of a first heat distribution throughout an integrated circuit design, the integrated circuit design including at least a set of circuit blocks. In some embodiments, the performing the simulation includes obtaining configured power information for at least each circuit block of the set of circuit blocks in the integrated circuit design. In some embodiments, the performing the simulation further includes determining a heat signature of the integrated circuit design from at least the configured power information for each circuit block of the set of circuit blocks included in the integrated circuit design, the heat signature including heat values distributed throughout the integrated circuit design. In some embodiments, the performing the simulation further includes modifying the integrated circuit design in response to at least determining that the heat values of the heat signature of the integrated circuit design are not within a heat range. In some embodiments, the method further includes manufacturing the integrated circuit according to the integrated circuit design. In some embodiments, the method further includes simultaneously performing a burn-in test of the integrated circuit and an automated test of the integrated circuit, the integrated circuit being configured to operate according to simulated design power levels and being coupled to the test circuit board. In some embodiments, the burn-in test has a minimum burn-in temperature of the integrated circuit and a burn-in heat distribution across the integrated circuit.

Still another aspect of this description relates to a testing system. In some embodiments, the testing system includes an integrated circuit, a carrier wafer coupled to at least the integrated circuit, and a first system electrically coupled to the integrated circuit. In some embodiments, the first system includes a non-transitory computer readable medium configured to store executable instructions, and a processor coupled to the non-transitory computer readable medium. In some embodiments, the processor is configured to execute the executable instructions for performing a simulation of a first heat distribution throughout an integrated circuit design, the integrated circuit design corresponding to the integrated circuit. In some embodiments, the testing system is configured to simultaneously perform a burn-in test of the integrated circuit and an automated test of the integrated circuit. In some embodiments, the burn-in test has a minimum burn-in temperature of the integrated circuit and a burn-in heat distribution across the integrated circuit. In some embodiments, the testing system configured to simultaneously perform the burn-in test of the integrated circuit and the automated test of the integrated circuit includes configuring a set of circuit blocks and a first set of heaters as a first set of heat sources for the burn-in test of the integrated circuit thereby generating a first heat signature of the integrated circuit.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of testing an integrated circuit on a test circuit board, the integrated circuit including at least a set of circuit blocks or a first set of heaters, the method comprising:

performing, by a processor, a simulation of a first heat distribution throughout an integrated circuit design, the integrated circuit design corresponding to the integrated circuit, the performing the simulation comprising:
  determining a heat signature of the integrated circuit design from at least configured power information or location information for each circuit block of the set of circuit blocks or each heater of the set of heaters included in the integrated circuit design, the heat signature including heat values distributed throughout the integrated circuit design; and
  simultaneously performing a burn-in test of the integrated circuit and an automated test of the integrated circuit, the integrated circuit being coupled to the test circuit board, wherein the burn-in test has at least one of a minimum burn-in temperature of the integrated circuit or a burn-in heat distribution across the integrated circuit.

2. The method of claim 1, wherein the determining the heat signature of the integrated circuit design from at least the configured power information or the location information for each circuit block of the set of circuit blocks or each heater of the set of heaters included in the integrated circuit design comprises:
  dividing the integrated circuit design into a grid of windows based on a window size.

3. The method of claim 2, wherein the determining the heat signature of the integrated circuit design from at least the configured power information or the location information for each circuit block of the set of circuit blocks or each heater of the set of heaters included in the integrated circuit design further comprises:
  determining a power value of each window based on at least the power information or the location information of each circuit block of the set of circuit blocks.

4. The method of claim 3, wherein the determining the power value of each window based on at least the power information or the location information of each circuit block of the set of circuit blocks is expressed by:

$$P = NE/PE,$$

where P is the power value of each window, NE is a number of elements in a first region of the integrated circuit design, and PE is a power consumed by the circuit block or the heater within the first region.

5. The method of claim 3, wherein the determining the heat signature of the integrated circuit design from at least the configured power information or the location information for each circuit block of the set of circuit blocks or each heater of the set of heaters included in the integrated circuit design further comprises:
  for each window, determining a total heat value (HT) of a window based on a power value of the window and a power value of other windows.

6. The method of claim 5, wherein the determining the total heat value (HT) of the window based on the power value of the window and the power value of other windows is expressed by:

$$HT = \sum_{j=1}^{m-1} \sum_{i=1}^{n-1} k * \frac{Pij}{Dij}$$

where Pij is a power value of ith and jth indices, k is a constant based on a material of the circuit block or the heater, Dij is a distance between the ith and jth window, m is a number of rows in the grid of windows, n is a number of columns in the grid of windows.

7. The method of claim 5, wherein the determining the heat signature of the integrated circuit design from at least the configured power information or the location information for each circuit block of the set of circuit blocks or each heater of the set of heaters included in the integrated circuit design further comprises:
  populating a heat map according to the total heat value of each window.

8. The method of claim 1, wherein the first heat distribution throughout the integrated circuit design is uniform.

9. The method of claim 1, wherein the simultaneously performing the burn-in test of the integrated circuit and the automated test of the integrated circuit are performed without an oven or a burn-in board.

10. The method of claim 1, wherein performing the simulation of the first heat distribution throughout the integrated circuit design comprises:
  modifying the integrated circuit design based on the first heat distribution throughout the integrated circuit design.

11. A method of testing an integrated circuit on a test circuit board, the method comprising:
  performing, by a processor, a simulation of a first heat distribution throughout an integrated circuit design, the integrated circuit design including at least a set of circuit blocks, the performing the simulation comprising:
    obtaining configured power information for at least each circuit block of the set of circuit blocks in the integrated circuit design;
    determining a heat signature of the integrated circuit design from at least the configured power information for each circuit block of the set of circuit blocks included in the integrated circuit design, the heat signature including heat values distributed throughout the integrated circuit design; and
    modifying the integrated circuit design in response to at least determining that the heat values of the heat signature of the integrated circuit design are not within a heat range;
  manufacturing the integrated circuit according to the integrated circuit design; and
  simultaneously performing a burn-in test of the integrated circuit and an automated test of the integrated circuit, the integrated circuit being configured to operate according to simulated design power levels and being coupled to the test circuit board, wherein the burn-in test has a minimum burn-in temperature of the integrated circuit and a burn-in heat distribution across the integrated circuit.

12. The method of claim 11, further comprising:
  not modifying the integrated circuit design in response to at least determining that the heat values of the heat signature of the integrated circuit design are within the heat range or determining that a number of iterations of the simulation exceeds a user defined limit.

13. The method of claim 11, wherein modifying the integrated circuit design comprises:
  modifying a configured power of at least an element in the integrated circuit design in response to determining that the heat values of the heat signature of the integrated circuit design are not within the heat range of the integrated circuit design, the element including at least a first circuit block of the set of circuit blocks.

14. The method of claim 13, wherein modifying the configured power of at least the element in the integrated circuit design comprises:

increasing the configured power of at least the first circuit block of the set of circuit blocks.

15. The method of claim 13, wherein modifying the configured power of at least the element in the integrated circuit design comprises:
decreasing the configured power of at least the first circuit block of the set of circuit blocks.

16. The method of claim 11, wherein performing the simulation of the first heat distribution throughout the integrated circuit design further comprises:
extracting location information for each circuit block of the set of circuit blocks in the integrated circuit design from a design file.

17. The method of claim 11, wherein the first heat distribution throughout the integrated circuit design is uniform.

18. The method of claim 11, wherein the simultaneously performing the burn-in test of the integrated circuit and the automated test of the integrated circuit are performed without an oven or a burn-in board.

19. A testing system comprising:
an integrated circuit;
a carrier wafer coupled to at least the integrated circuit; and
a first system electrically coupled to the integrated circuit, the first system comprising:
 a non-transitory computer readable medium configured to store non-transitory instructions; and
 a processor coupled to the non-transitory computer readable medium, wherein the processor is configured to execute the non-transitory instructions for:
  performing a simulation of a first heat distribution throughout an integrated circuit design, the integrated circuit design corresponding to the integrated circuit;
wherein the testing system is configured to simultaneously perform a burn-in test of the integrated circuit and an automated test of the integrated circuit, wherein the burn-in test has a minimum burn-in temperature of the integrated circuit and a burn-in heat distribution across the integrated circuit, wherein the testing system configured to simultaneously perform the burn-in test of the integrated circuit and the automated test of the integrated circuit comprises:
configuring a set of circuit blocks and a first set of heaters as a first set of heat sources for the burn-in test of the integrated circuit thereby generating a first heat signature of the integrated circuit.

20. The testing system of claim 19, wherein the testing system configured to simultaneously perform the burn-in test of the integrated circuit and the automated test of the integrated circuit further comprises:
placing the integrated circuit on the carrier wafer; and
configuring at least a portion of the carrier wafer as a second set of heat sources for the burn-in test of the integrated circuit thereby generating a second heat signature of the integrated circuit,
wherein the second set of heat sources corresponding to a second set of heaters positioned in a grid arrangement of an integrated circuit die, and the integrated circuit die is part of the carrier wafer.

* * * * *